United States Patent [19]

McDonald et al.

[11] Patent Number: 6,053,951
[45] Date of Patent: *Apr. 25, 2000

[54] MAN/MACHINE INTERFACE GRAPHICAL CODE GENERATION WIZARD FOR AUTOMATICALLY CREATING MMI GRAPHICAL PROGRAMS

[75] Inventors: Ryan O. McDonald; Ramprasad Kudukoli, both of Austin; Gregory C. Richardson, Round Rock, all of Tex.

[73] Assignee: National Instruments Corporation, Austin, Tex.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/170,329

[22] Filed: Oct. 13, 1998

Related U.S. Application Data

[62] Division of application No. 08/907,247, Aug. 6, 1997
[60] Provisional application No. 60/052,105, Jul. 10, 1997.

[51] Int. Cl.$^7$ ........................................................ G06F 9/45
[52] U.S. Cl. .................................................. 717/1; 717/11
[58] Field of Search ................................... 345/356, 349, 345/334, 474; 395/500, 701, 704, 712, 702; 707/102

[56] References Cited

U.S. PATENT DOCUMENTS

| | | | |
|---|---|---|---|
| 4,695,833 | 9/1987 | Ogura et al. | 345/134 |
| 5,432,903 | 7/1995 | Nielsen | 345/349 |
| 5,485,601 | 1/1996 | Ching | 395/500 |
| 5,495,567 | 2/1996 | Iizawa et al. | 345/334 |

(List continued on next page.)

OTHER PUBLICATIONS

Nlelsen, "Traditional dialogure designe applied to moderns user interface", Comm. of the ACM, vo. 33, No. 10, pp. 109–118, Oct. 1990.

(List continued on next page.)

*Primary Examiner*—Tariq R. Hafiz
*Assistant Examiner*—Anil Khatri
*Attorney, Agent, or Firm*—Conley, Rose & Tayon PC; Jeffrey C. Hood

[57] ABSTRACT

A computer-implemented system and method for automatically generating graphical code in a graphical programming system. The computer memory stores a plurality of graphical code templates. The graphical programming system executing on the computer system also includes a plurality of front panel objects or controls which represent the user interface. One or more associated graphical code portions or templates can be associated with certain of the controls. According to the present invention, the user first selects a control and then preferably initiates the graphical code generation wizard for the control. When the graphical code generation wizard is invoked, the wizard displays on the screen a configuration panel or dialog, prompting the user to configure the control or object. The user then selects parameter values to configure certain aspects of the graphical code being created. The graphical code generation wizard selects a graphical code template in response to the control and configures the graphical code template with the parameter values. The graphical code generation wizard then creates an association between the control and the configured graphical code. The user can edit wizard created code either using the graphical code generation wizard or by unlocking the association between the control and the code and making the changes directly in the block diagram. The present invention also comprises a graphical code generation wizard designed specifically for industrial automation applications, referred to as the MMI G Wizard.

52 Claims, 29 Drawing Sheets

Microfiche Appendix Included
(24 Microfiche, 59 Pages)

U.S. PATENT DOCUMENTS

| | | | |
|---|---|---|---|
| 5,603,034 | 2/1997 | Swanson | 395/701 |
| 5,664,180 | 9/1997 | Halpert et al. | 707/102 |
| 5,668,966 | 9/1997 | Ono et al. | 345/356 |
| 5,696,975 | 12/1997 | Moore et al. | 395/712 |
| 5,760,788 | 6/1998 | Chainini et al. | 345/474 |
| 5,923,885 | 7/1999 | Johnson et al. | 395/712 |
| 5,946,693 | 8/1999 | Mizuyama et al. | 707/103 |
| 5,966,532 | 10/1999 | McDonald et al. | 395/701 |
| 5,974,256 | 10/1998 | Matthews et al. | 395/705 |

OTHER PUBLICATIONS

Praecofer et al, "Visual modeling of DEVS based multiformalism systems based on higraphs", Proc. of winter simulation conf. pp.595–603, 1993.

Carlisle et al, "Rapid A free portable GUI design tool", ACM pp. 158–164, Mar. 1998.

Cockburn et al, "Towards literate toold for novice programmers", ACSE–ACM, pp. 107–116, 1997.

Janssen et al, "Generating user interface from data models and dialouge net specifications", ACM pp. 418–423, May 1993.

Guemhioui et al., Object orienetd design and automatic ADA code generation in the education of software engineers, ACM Conf. pp. 126–136, Feb. 1993.

Jensen & Koch, An ecological man–machine interafce for temporal visualization, Intelligent User Interface Conf. 93 ACM, pp. 235–238, Jul. 1992.

Du et al., "Experience with object orineted methodologies in the new online event display for delphi", pp. 873–876, 1998.

Sefika et al., "Monitoring compliance of a software system with high level design models", Proc. of ICSE–IEEE, pp. 387–396, 1996.

Cohen et al., "Automatic monitoring of software requirements", ICSE—ACM, pp. 602–603, 1997.

Kevin Weeks, "The sweet smell of C++", Windows Tech. Journal, 69–72, Sep. 1994.

Henderson Sellers, "O O Diagram Connectivity", JOOP, vol. 11, No. 7, pp. 60–68, Nov. 1998.

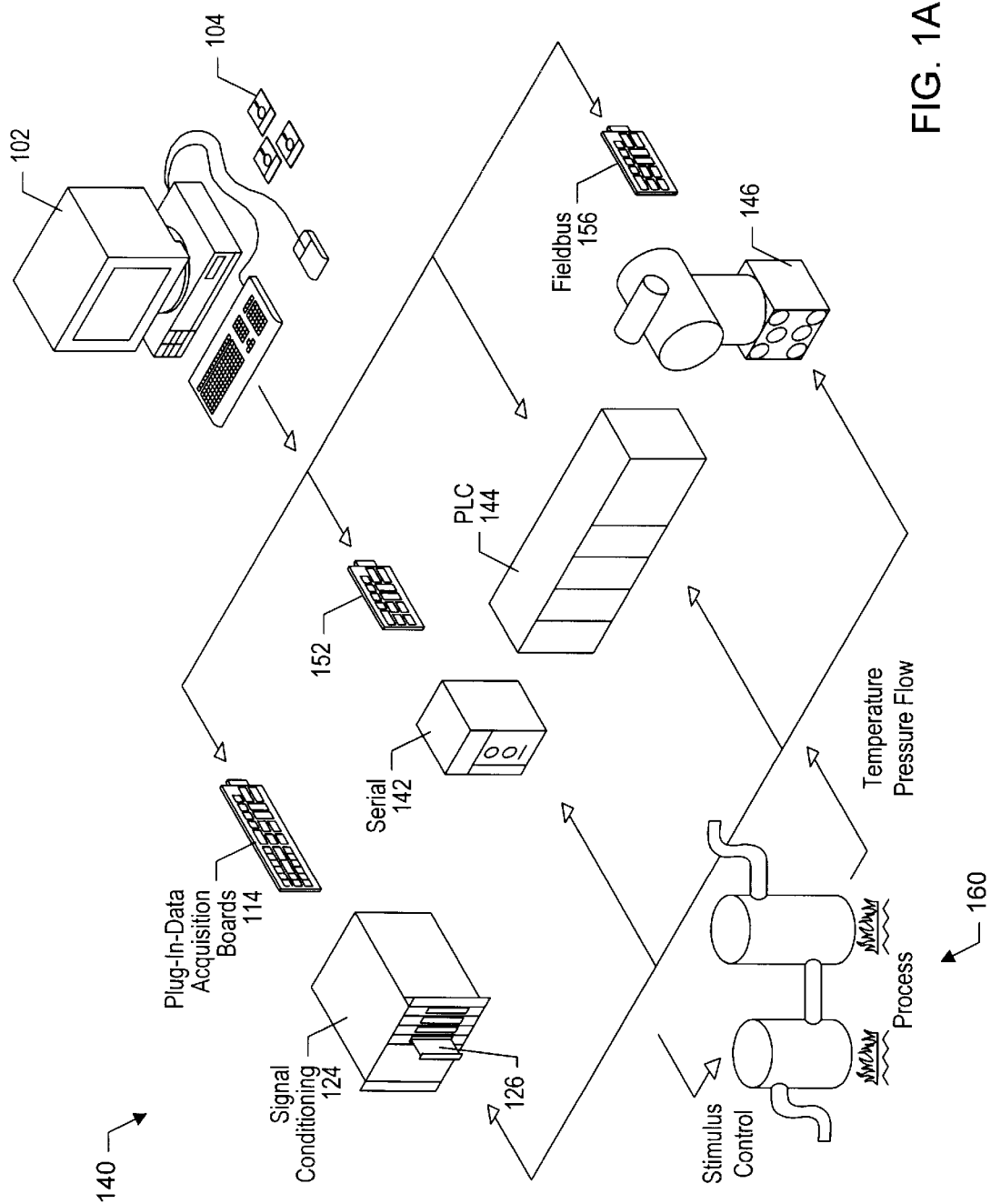

| | |
|---|---|
| Boolean | 1 |
| Numeric | 2 |
| String | 3 |
| Array | 4 |
| Cluster | 5 |
| Datalog Hefnum | 6 |
| Device Refnum | 7 |
| Occurrence Refnum | 8 |
| NetConnRefnum | 9 |
| ByteStream Refnum | 10 |
| Color Box | 11 |
| Ring | 12 |
| Enua | 13 |
| Slider | 14 |
| Knob | 15 |
| Path | 16 |
| Table | 17 |
| Waveform Chart | 18 |
| Waveform Graph | 19 |
| XY Graph | 20 |
| Intensity Chart | 21 |
| Intensity Graph | 22 |
| Pict | 23 |
| Pixmap | 24 |
| Color Ramp | 25 |
| Single Select Listbox | 26 |
| Multi Select Listbox | 27 |

FIG. 9

MAN/MACHINE INTERFACE GRAPHICAL CODE GENERATION WIZARD FOR AUTOMATICALLY CREATING MMI GRAPHICAL PROGRAMS

PRIORITY DATA

This application is a divisional of U.S. patent application Ser. No. 08/907,247 titled "Graphical Code Generation Wizard for Automatically Creating Graphical Programs" and filed Aug. 6, 1997, which application claims benefit of priority of U.S. Provisional Application Ser. No. 60/052,105 titled "Graphical Code Generation Wizard for Automatically Creating Graphical Programs" filed Jul. 10, 1997, whose inventors were originally listed to be Ryan O'Neill McDonald and Ramprasad Kudukoli, and which application was amended on Jul. 14, 1997 to further include Gregory Clark Richardson in the listing of inventors.

MICROFICHE APPENDICES

"The present application includes two microfiche source code appendices. Appendix 1 (24 frames) comprises the graphical source ode of the MMI G Wizard graphical program, which is one example of the graphical code generation wizard of the present invention. Appendix 2 (59 frames) comprises graphical source code of graphical code portion or templets which are used by the MMI G Wizard in creating graphical code. The graphical source code in these appendices is written in the "G" programming language using the LabVIEW or BridgeVIEW graphical programming systems."

RESERVATION OF COPYRIGHT

A portion of the disclosure of this patent document, including the two appendices contained herein, contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

FIELD OF THE INVENTION

The present invention relates to graphical programming, and in particular to a system and method for automatically generating graphical program code based on user interface configurations created by the user.

DESCRIPTION OF THE RELATED ART

Traditionally, high level text-based programming languages have been used by programmers in writing applications programs. Many different high level programming languages exist, including BASIC, C, FORTRAN, Pascal, COBOL, ADA, APL, etc. Programs written in these high level languages are translated to the machine language level by translators known as compilers. The high level programming languages in this level, as well as the assembly language level, are referred to as text-based programming environments.

Increasingly computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a text-based environment to implement his model, the efficiency with which the computer system can be utilized to perform such modelling often is reduced.

Examples of fields in which computer systems are employed to model and/or control physical systems are the fields of instrumentation, process control, and industrial automation. Computer modeling or control of devices such as instruments or industrial automation hardware has become increasingly desirable in view of the increasing complexity and variety of instruments and devices available for use. However, due to the wide variety of possible testing/control situations and environments, and also the wide array of instruments or devices available, it is often necessary for a user to develop a program to control a desired system. As discussed above, computer programs used to control such systems had to be written in conventional text-based programming languages such as, for example, assembly language, C, FORTRAN, BASIC, or Pascal. Traditional users of these systems, however, often were not highly trained in programming techniques and, in addition, traditional text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. No. 4,901,221 to Kodosky et al discloses a graphical system and method for modelling a process, i.e. a graphical programming environment which enables a user to easily and intuitively model a process. The graphical programming environment disclosed in Kodosky et al can be considered the highest and most intuitive way in which to interact with a computer. A graphically based programming environment can be represented at level above text-based high level programming languages such as C, Pascal, etc. The method disclosed in Kodosky et al allows a user to construct a diagram using a block diagram editor, such that the diagram created graphically displays a procedure or method for accomplishing a certain result, such as manipulating one or more input variables to produce one or more output variables. In response to the user constructing a data flow diagram or graphical program using the block diagram editor, machine language instructions are automatically constructed which characterize an execution procedure which corresponds to the displayed procedure. Therefore, a user can create a computer program solely by using a graphically based programming environment. This graphically based programming environment may be used for creating virtual instrumentation systems, industrial automation systems and modeling processes, as well as for any type of general programming.

Therefore, Kodosky et al teaches a graphical programming environment wherein a user places on manipulates icons in a block diagram using a block diagram editor to create a data flow "program." A graphical program for controlling or modeling devices, such as instruments, processes or industrial automation hardware, is referred to as a virtual instrument (VI). In creating a virtual instrument, a user preferably creates a front panel or user interface panel. The front panel includes various front panel objects, such as controls or indicators that represent the respective input and output that will be used by the graphical program or VI, and may include other icons which represent devices being controlled. When the controls and indicators are created in the front panel, corresponding icons or terminals are automatically created in the block diagram by the block diagram editor. Alternatively, the user can first place terminal icons in the block diagram which cause the display of corresponding front panel objects in the front panel. The user then chooses various functions that accomplish his desired result, connecting the corresponding function icons between the terminals of the respective controls and indicators. In other words, the user creates a data flow program, referred to as a block diagram, representing the graphical data flow which accomplishes his desired function. This is done by wiring up the various function icons between the control icons and indicator icons. The manipulation and organization of icons in turn produces machine language that accomplishes the desired method or process as shown in the block diagram.

A user inputs data to a virtual instrument using front panel controls. This input data propagates through the data flow block diagram or graphical program and appears as changes on the output indicators. In an instrumentation application, the front panel can be analogized to the front panel of an instrument. In an industrial automation application the front panel can be analogized to the MMI (Man Machine Interface) of a device. The user adjusts the controls on the front panel to affect the input and views the output on the respective indicators.

Thus, graphical programming has become a powerful tool available to programmers. Graphical programming environments such as the National Instruments LabVIEW and BridgeVIEW products have become very popular. Tools such as LabVIEW and BridgeVIEW have greatly increased the productivity of programmers, and increasing numbers of programmers are using graphical programming environments to develop their software applications. In particular, graphical programming tools are being used for test and measurement, data acquisition, process control, man machine interface (MMI), and supervisory control and data acquisition (SCADA) applications, among others.

In many instances a user is required to repetitively generate similar blocks of code to perform desired functions. For example, in MMI/SCADA applications, the user may be required to generate a number of tag monitoring loops to monitor tag values (data values). Similarly, in other applications a user is typically required to generate a number of code routines. Therefore, in order to further simplify program development, it would be desirable to provide a system and method which automatically generates graphical code in response to high level user input, such as a user interface configuration.

SUMMARY OF THE INVENTION

The present invention comprises a computer-implemented system and method for automatically generating graphical code in a graphical programming system. The computer memory stores a plurality of graphical code portions, also referred to as graphical code templates or G code templates. The graphical code portions or templates comprise predeveloped portions of graphical code which are configurable by selection or configuration of one or more parameters. The graphical code portions or templates comprise portions of commonly used code. The graphical programming system executing on the computer system also includes a plurality of front panel objects or controls which represent or indicate input to or output from a graphical program, or represent devices in the graphical program. At least a subset of the controls, e.g., a first plurality of the controls, each include one or more associated graphical code portions or templates.

According to the present invention, the user first selects a control which represents input to or output from a graphical program. The control is preferably selected from a palette of controls, or may be selected in other manners. The control is selected from the first plurality of controls, and thus has at least one associated graphical code portion or template. In the preferred embodiment, the control is displayed in a user interface panel, such as a front panel of a graphical program or VI.

The user then preferably initiates a graphical code generation wizard for the control. In the preferred embodiment, the user "pops up" on the control with the mouse and selects the graphical code generation wizard from a menu. Alternatively, the user selects the control from a special palette comprising only the first plurality of controls having an associated graphical code portion or template. In this embodiment, selection of a control from this special palette automatically initiates the graphical code generation wizard.

In one embodiment, the computer system memory stores a plurality of graphical code generation wizards, wherein the plurality of graphical code generation wizards are configured for different types of applications. In this embodiment, each graphical code generation wizard includes a plurality of graphical code portions or templates corresponding to the application type. The user can then select the desired type of graphical code generation wizard based on the desired application. Alternatively, the system includes a single general purpose graphical code generation wizard program, and the user can further select from a plurality of different type of graphical code portions or templates, based on the desired application.

In the preferred embodiment, when the graphical code generation wizard is invoked, the wizard displays on the screen a configuration panel or dialog, prompting the user to configure the control or object. In response to the displayed dialog box, the user selects one or more parameter values, wherein the parameter values indicate a desired functionality of the graphical program. In other words, the user selects the parameter values to configure certain aspects of the graphical code being created. In one embodiment, the user also selects the graphical code portion or template from a plurality of template selections prior to selecting the parameter values.

The graphical code generation wizard selects a graphical code portion in response to the control, wherein the selected graphical code portion corresponds to the control. The selection of the graphical code portion may also be based on one or more of the configured parameter values. For example, if a control has more than one associated graphical code portion or template, one or more of the parameter values selected by the user may determine which code portion or template to use. In addition, the graphical code portion or template may also be selected based on a plurality of controls in a user interface panel. Further, in another embodiment the graphical code portion or template is selected directly by the user from a list of template selections.

The graphical code generation wizard then configures the graphical code portion with the one or more parameter values to produce a configured graphical code portion. The graphical code generation wizard inserts the parameter values selected or configured by the user into the graphical code portion or template. In the graphical programming system of the preferred embodiment, the user creates the graphical program in a graphical program panel, referred to as a block diagram window. In this embodiment, the graphical code generation wizard operates to copy the configured graphical code portion or template into the block diagram window where the graphical program is being created.

The graphical code generation wizard then creates an association between the control and the configured graphical code portion. Creating the association preferably includes locking the association between the control and the configured graphical code portion, wherein the locking prevents user editing of the configured graphical code portion. After the user has invoked the graphical code generation wizard to create a configured graphical code portion, this configured graphical code portion may form the entire graphical program being created, or may comprise a portion of a larger graphical program being created.

If the user later desires to edit a configured graphical code portion created using the graphical code generation wizard, the user can either (1) invoke the graphical code generation wizard and make the desired changes using the configuration panel, or (2) unlock the configured graphical code portion and make the changes directly in the block diagram.

When the user invokes the graphical code generation wizard to make the desired changes to wizard created graphical code, the user first initiates the graphical code generation wizard for the control and/or for the graphical code, preferably by popping up on the control and selecting the graphical code generation wizard menu item. The graphical code generation wizard then determines if the control has associated wizard created graphical code. If the control does have an associated graphical code portion, then the graphical code generation wizard displays the configuration dialog with the current parameter configuration information of the configured graphical code portion. The user can then modify the parameter configuration information, which causes the graphical code generation wizard to modify the configured graphical code portion accordingly. Modifying the configured graphical code template may also involve selecting a new graphical code portion, if a changed parameter value necessitates the new template.

As noted above, the user can also choose to make the changes directly in the block diagram, instead of making the changes in the configuration panel using the wizard. Using this method, the user first unlocks the association between the control and the configured graphical code portion. This unlocking causes the wizard to remove the association between the control and the configured graphical code portion. After the user unlocks the association, and the association is removed, the user can change the configured graphical code portion directly in the block diagram window. When the user changes the wizard created graphical code in this manner, then the association is preferably permanently removed. Thus, when the user selects the control which was previously associated with this code portion, the wizard can be used to create an entirely new graphical code portion, and the modified graphical code portion which was previously associated with this control remains in the program.

The user can also modify or replace a control on the front panel which has an associated graphical code. Modification of a control includes changing the direction of the control and replacing the control with a new control, as well as deleting the control. If the user modifies a control which has a configured graphical code portion, then the graphical code generation wizard first determines if the association between the control and the code portion can be maintained in response to the modification. If the association can be maintained, then the association remains. If the association can not be maintained in view of the user's modification, then the wizard breaks the association. In this case, the graphical code preferably remains in the program, however the code is no longer linked to a control. If the user pops up on the modified control and selects the graphical code generation wizard, the wizard can be used to create new code associated with the modified control.

The present invention also comprises a graphical code generation wizard designed specifically for industrial automation applications, referred to as the MMI G Wizard. The MMI G Wizard includes graphical code portions or templates for constructing tag monitoring and control loops and other often-used industrial automation software routines. The MMI G Wizard thus provides an easy interface for the user to generate repetitive pieces of diagram code for industrial automation applications. The MMI G Wizard associates a front panel control or indicator with a tag, and generates the necessary Wizard graphical code or sub-diagram for the user-specified configuration.

BRIEF DESCRIPTION OF THE DRAWINGS

A better understanding of the present invention can be obtained when the following detailed description of the preferred embodiment is considered in conjunction with the following drawings, in which:

FIG. 1A illustrates an industrial automation system;

FIG. 9 illustrates ID values of certain front panel objects;

Figure 1:
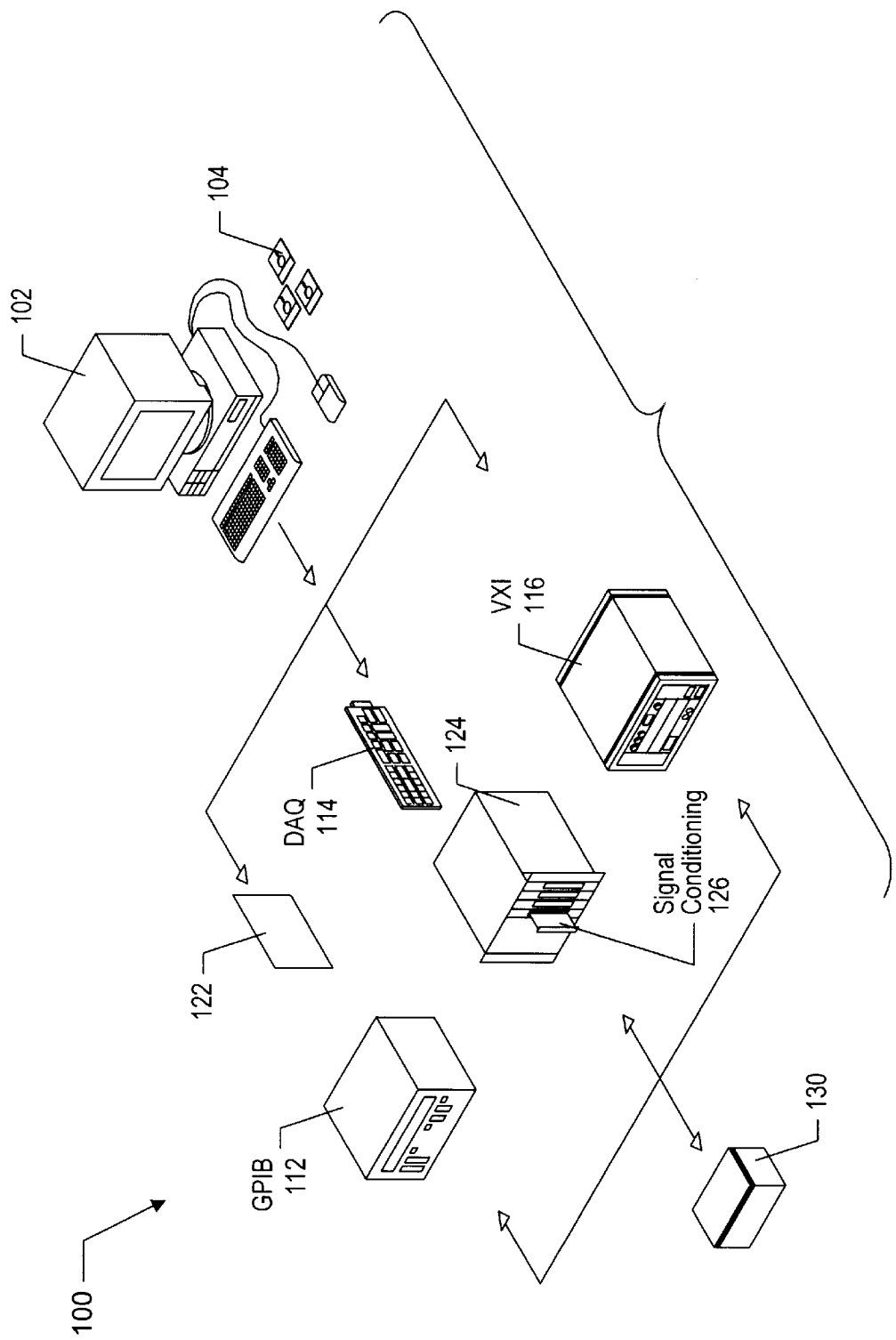
FIG. 1 illustrates an instrumentation control system.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE PREFERRED EMBODIMENT

Incorporation by Reference

The following U.S. Patents and patent applications are hereby incorporated by reference in their entirety as though fully and completely set forth herein.

U.S. Pat. No. 4,901,221 titled "Graphical System for Modelling a Process and Associated Method," issued on Feb. 13, 1990.

U.S. Pat. No. 4,914,568 titled "Graphical System for Modelling a Process and Associated Method," issued on Apr. 3, 1990.

U.S. Pat. No. 5,301,336 titled "Graphical Method for Programming a Virtual Istrument" filed Jul. 12, 1989 and issued Apr. 5, 1994.

U.S. Pat. No. 5,291,587 titled "Graphical System for Executing a Process and for Programming a Computer to Execute a Process, Including Graphical Variable Inputs and Variable Outputs" filed Nov. 19, 1992 and issued Mar. 1, 1994.

U.S. Pat. No. 5,301,301 titled "Polymorphic Dataflow block Diagram System and Method for Programming a Computer" and filed Jan. 30, 1991.

U.S. Pat. No. 5,481,741 titled "Method and Apparatus for Providing Attribute Nodes in a Graphical Data Flow Environment".

U.S. patent application Ser. No. 08/292,091 filed Aug. 18, 1994, titled "Method and Apparatus for Providing Improved Type Compatibility and Data Structure Organization in a Graphical Data Flow Diagram".

U.S. Pat. No. 5,475,851 titled "Method and Apparatus for Improved Local and Global Variable Capabilities in a Graphical Data Flow Program".

U.S. Pat. No. 5,497,500 titled "Method and Apparatus for More Efficient Function Synchronization in a Data Flow Program".

U.S. patent application Ser. No. 08/474,307 titled "Method and Apparatus for Providing Stricter Data Type Capabilities in a Graphical Data Flow Environment" filed Jun. 7, 1995.

U.S. Pat. No. 5,481,740 titled "Method and Apparatus for Providing Autoprobe Features in a Graphical Data Flow Diagram".

U.S. Pat. No. 5,504,917 titled "Method and Apparatus for Providing Picture Generation and Control Features in a Graphical Data Flow Environment"

The above-referenced patents and patent applications disclose various aspects of the LabVIEW graphical programming and development system.

The LabVIEW and BridgeVIEW graphical programming manuals, including the "G Programming Reference Manual", available from National Instruments Corporation, are also hereby incorporated by reference in their entirety.

FIGS. 1 and 1A—Instrumentation and Industrial Automation Systems

Referring now to FIG. 1, an instrumentation control system 100 is shown. The system 100 comprises a computer 102 which connects to one or more instruments. The computer 102 comprises a CPU, a display screen, memory, and one or more input devices such as a mouse or keyboard as shown. The computer 102 connects through the one or more instruments to analyze, measure or control a unit under test (UUT) or process 130.

The one or more instruments may include a GPIB instrument 112, a data acquisition board 114, and/or a VI instrument 116. The GPIB instrument 112 is coupled to the computer 102 via a GPIB interface card 122 provided by the computer 102. The data acquisition board 114 is coupled to the computer 102, and preferably interfaces through signal conditioning circuitry 124 to the UUT. The signal conditioning circuitry 124 preferably comprises an SCXI (Signal Conditioning eXtensions for Instrumentation) chassis comprising one or more SCXI modules 126. Both the GPIB card 122 and the DAQ card 114 are typically plugged in to an I/O slot in the computer 102, such as a PCI bus slot, a PC Card slot, or an ISA, EISA or Microchannel bus slot provided by the computer 102. However, these cards 122 and 114 are shown external to computer 102 for illustrative purposes. The VXI instrument 116 is coupled to the computer 102 via a VXI bus, MXI bus, or other serial or parallel bus provided by the computer 102. The computer 102 preferably includes VXI interface logic, such as a MXI or GPIB interface card (not shown) comprised in the computer. A serial instrument (not shown) may also be coupled to the computer 102 through a serial port, such as an RS-232 port, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 130, or are coupled to receive field signals, typically generated by transducers. The system 100 may be used in a data acquisition and control application, in a test and measurement application, a process control application, or a man-machine interface application.

Referring now to FIG. 1A, an industrial automation system 140 is shown. The industrial automation system 140 is similar to the instrumentation or test and measurement system 100 shown in FIG. 1. Elements which are similar or identical to elements in FIG. 1 have the same reference numerals for convenience. The system 140 comprises a computer 102 which connects to one or more devices or instruments. The computer 102 comprises a CPU, a display sen, memory, and one or more input devices such as a mouse or keyboard as shown. The computer 102 connects through the one or more devices to a process or device 160 to perform an automation function, such as MMI (Man Machine Interface), SCADA (Supervisory Control and Data Acquisition), portable or distributed acquisition, advanced analysis, or control.

The one or more devices may include a data acquisition board 114, a serial instrument 142, a PLC (Programmable Logic Controller) 144, or a fieldbus network card 156. The data acquisition board 114 is coupled to or comprised in the computer 102, and preferably interfaces through signal conditioning circuitry 124 to the process 160. The signal conditioning circuitry 124 preferably comprises an SCXI (Signal Conditioning extensions for Instrumentation) chassis comprising one or more SCXI modules 126. The serial instrument 142 is coupled to the computer 102 through a serial interface card 152, or through a serial port, such as an RS-232 port, provided by the computer 102. The PLC 144 couples to the computer 102 through a serial port, Ethernet port, or other proprietary interface. The fieldbus interface card 156 is preferably comprised in the computer 102 and interfaces through a fieldbus network to one or more fieldbus devices, such as valve 146. Each of the DAQ card 114, the serial card 152 and the fieldbus card 156 are typically plugged in to an I/O slot in the computer 102 as described above. However, these cards 114, 152 and 156 are shown external to computer 102 for illustrative purposes. In typical industrial automation systems a device will not be present of each interface type, and in fact many systems may only have one or more devices of a single interface type, such as only PLCs. The devices are coupled to the device or process 160.

Referring again to FIGS. 1 and 1A, the computer 102 preferably includes a memory media, such as an installation media, e.g., a CD-ROM or floppy disks 104, a system memory, such as DRAM (dynamic random access memory), SRAM, EDO RAM, etc., or a non-volatile media, e.g., a magnetic media such as a hard drive, or optical storage. The memory media preferably stores a graphical programming system and also stores computer programs according to the present invention. The present invention comprises a software program stored on a memory media of the computer 102 and executed by a CPU of the computer 102. The CPU executing code and data from the memory thus comprises a means for automatically generating graphical code according to the steps described below.

The instruments or devices in FIGS. 1 and 1A are controlled by graphical software programs which execute on the computer 102. The graphical software programs which perform data acquisition, analysis and/or presentation, e.g., for instrumentation control or industrial automation, are also referred to as virtual instruments. The present invention provides a system and method for automatically generating graphical program code.

In the preferred embodiment, the graphical code generation system and method is comprised in the LabVIEW or BridgeVIEW graphical programming systems, hereafter collectively referred to as LabVIEW, available from National Instruments. Also, in the preferred embodiment, the term "LabVIEW" is intended to include graphical programming systems which include G programming functionality, i.e., which include at least a portion of LabVIEW graphical programming functionality, including the BridgeVIEW graphical programming system.

Also, the term "graphical programming system" is intended to include any of various types of systems which are used to develop or create graphical code or graphical programs, including LabVIEW and BridgeVIEW from National Instruments, Visual Designer from Intelligent Instrumentation, Hewlett-Packard's VEE (Visual Engineering Environment), Snap-Master by HEM Data Corporation, DASYLab by DasyTec, and GFS DiaDem, among others.

Although in the preferred embodiment the graphical programs are involved with data acquisition/generation, analysis, and/or display, and for controlling or modeling instrumentation or industrial automation hardware, it is noted that the present invention can be used to create graphical programs for a plethora of software applications and are not limited to instrumentation or industrial automation applications. Thus, the system and method of the present invention is operable for automatically creating graphical programs or graphical code for any of various types of applications, including general purpose software applications such as word processing, spreadsheets, network control, games, etc.

Graphical Code Generation Wizard

Figure 2:
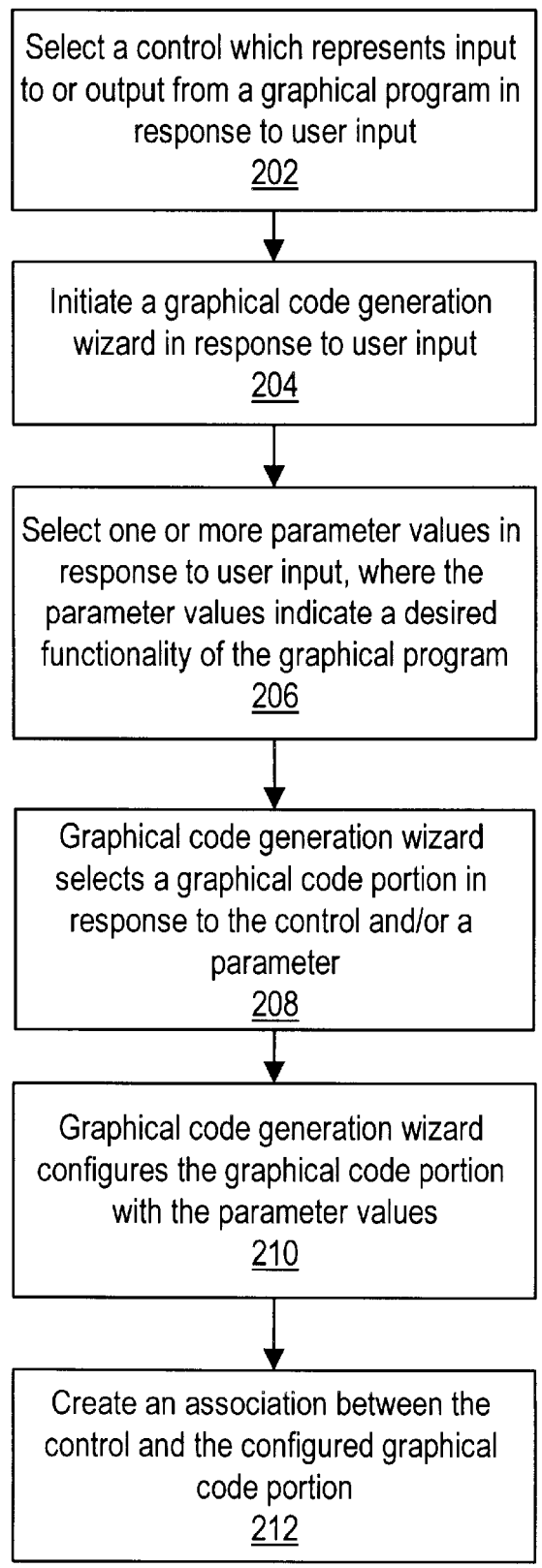
FIG. 2 is a flowchart diagram illustrating operation of the graphical code generation wizard of the present invention.

Referring now to FIG. 2, a flowchart diagram illustrating operation of the present invention is shown. The present invention comprises a computer-implemented method for automatically generating graphical code in a graphical programming system. It is noted that various of the steps in the flowcharts below can occur concurrently or in different orders.

The method below presumes that there are a plurality of graphical code portions, also referred to as graphical code templates or G code, stored in the memory of the computer system. The graphical code portions or templates comprise pre-developed portions of graphical code which are configurable by selection of one or more parameters. The graphical code portions or templates comprise portions of commonly used code. The graphical programming system executing on the computer system also includes a plurality of controls or objects, also referred to as front panel objects or objects. In the present disclosure, the terms "front panel object", "object" or "control" are intended to include any type of icon, panel or other computer-displayable item which represents or indicates input to or output from a graphical program, or represents a device being modeled in the graphical program, or indicates attributes associated with the graphical program.

For at least a subset, e.g., a first plurality, of the plurality of controls, graphical code portions or templates are included that can be associated with the controls. Stated another way, each of the first plurality of controls includes at least one associated graphical code portion or template. Also, in the preferred embodiment, for each of the first plurality of controls, generally only a subset of graphical code portions or templates can be associated with each respective control.

As shown, in step 202 the method comprises first selecting a control which represents input to or output from a graphical program, wherein the control is selected in response to user input. In other words, in step 202 the user selects a control which represents input and/or output to/from a graphical program. The control is preferably selected from a palette of controls, or may be selected in other manners. The control is one of the first plurality of controls, and thus has an associated graphical code portion or template. In the preferred embodiment, the control is displayed in a user interface panel, such as a front panel of a graphical program or VI. The control forms at least a portion of a graphical user interface for the graphical program. The control is preferably displayed on a panel, such as the front panel of a virtual Instrument (VI), wherein the control is operable to display data input to or output from the VI or graphical program.

In step 204 the method receives user input initiating a graphical code generation wizard for the control. In other words, in step 204 the user selects or initiates a graphical code generation wizard for the control. In the preferred embodiment, the user "pops up" on the control with a pointing device, e.g., a mouse, and selects a graphical code generation wizard menu item. Alternatively, in step 202 the user selects the control from a special palette comprising only the first plurality of controls having an associated graphical code portion or template. In this embodiment, selection of a control from this special palette in step 202 automatically initiates the graphical code generation wizard in step 204.

In one embodiment, the memory of the computer system 102 stores a plurality of graphical code generation wizards, wherein the plurality of graphical code generation wizards are configured for different types of applications. In this embodiment, each graphical code generation wizard includes a plurality of graphical code portions or templates corresponding to the application type. For example, a first graphical code generation wizard may be stored for a first type of application, such as MMI applications, and a second graphical code generation wizard may be stored for a second type of application, such as data acquisition applications. The first wizard includes a plurality of MMI graphical code portions or templates, and the second wizard includes a plurality of data acquisition graphical code portions or templates. The user can thus select the desired type of graphical code generation wizard based on the desired application. Alternatively, the system includes a single general purpose graphical code generation wizard program, and the user can further select from a plurality of different types of graphical code portions or templates, based on the desired application.

In step 206 the user selects one or more parameter values, wherein the parameter values indicate a desired functionality of the graphical program. In the preferred embodiment, when the graphical code generation wizard is invoked in step 204, the wizard displays on the screen a configuration panel or dialog, prompting the user to configure the control or object Examples of configuration panels are shown in FIGS. 20–29. The one or more parameter values are selected by the user using the configuration panel. The user selects the parameter values to configure certain aspects of the graphical code being created. In one embodiment, the user also selects the graphical code portion or template from a plurality of template selections prior to selecting the parameter values.

In step 208 the graphical code generation wizard selects a graphical code portion or template in response to the control, wherein the selected graphical code portion corresponds to the control. Thus a graphical code portion is selected from the plurality of graphical code portions stored in the memory of the computer system, wherein the selected graphical code portion is associated with the control selected in step 202.

The selection of the graphical code portion may also be based on one or more of the configured parameter values. For example, if a control has more than one associated graphical code portion or template, one or more of the parameter values selected by the user in step 206 may determine which code portion or template to use. In addition, the graphical code portion or template may also be selected based on a plurality of controls in a user interface panel. Further, in another embodiment the graphical code portion or template is selected by the user from a list of template selections.

Figure 30:
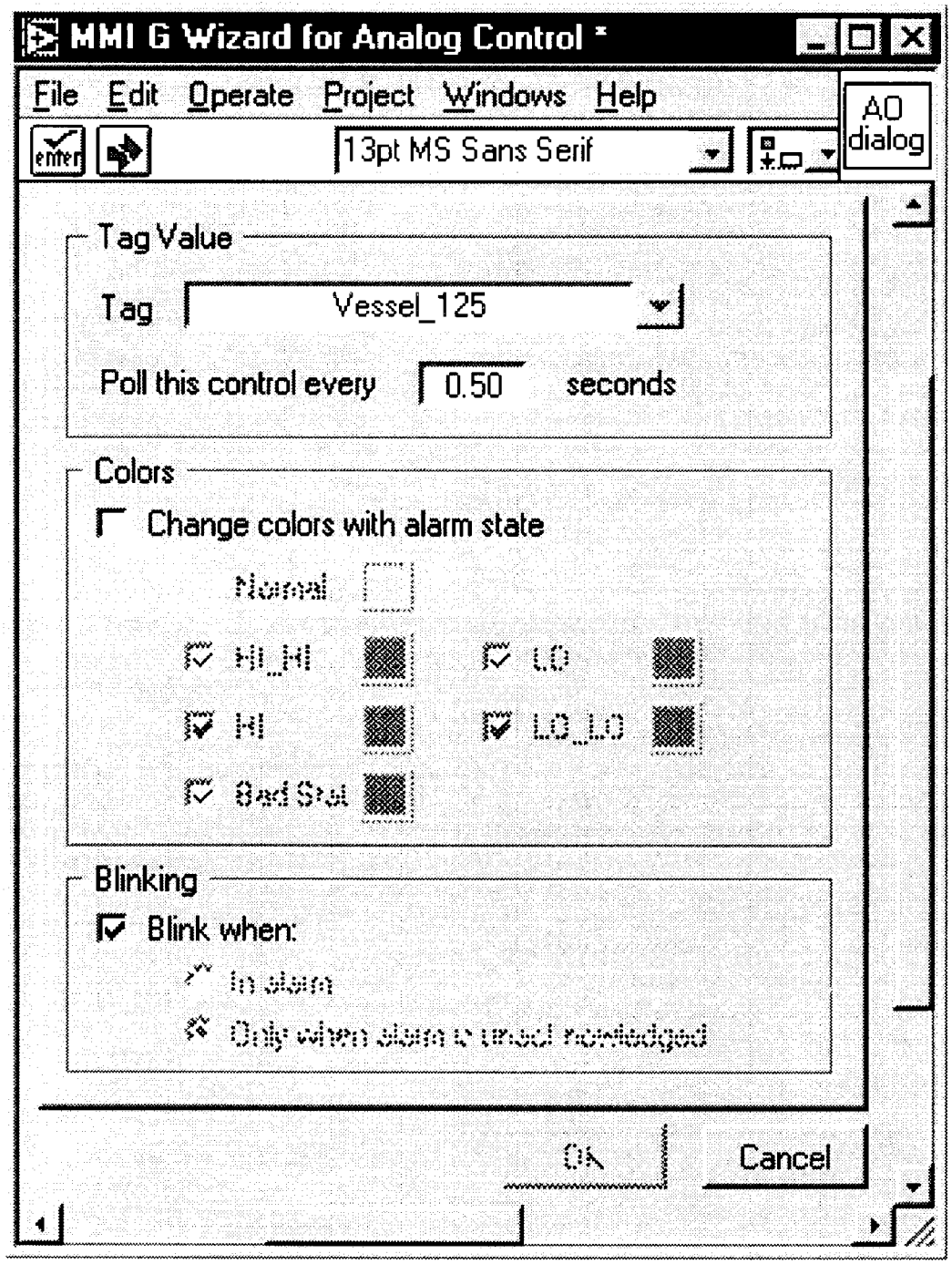
FIG. 30 illustrates a numeric indicator panel configuration.
Figure 31:
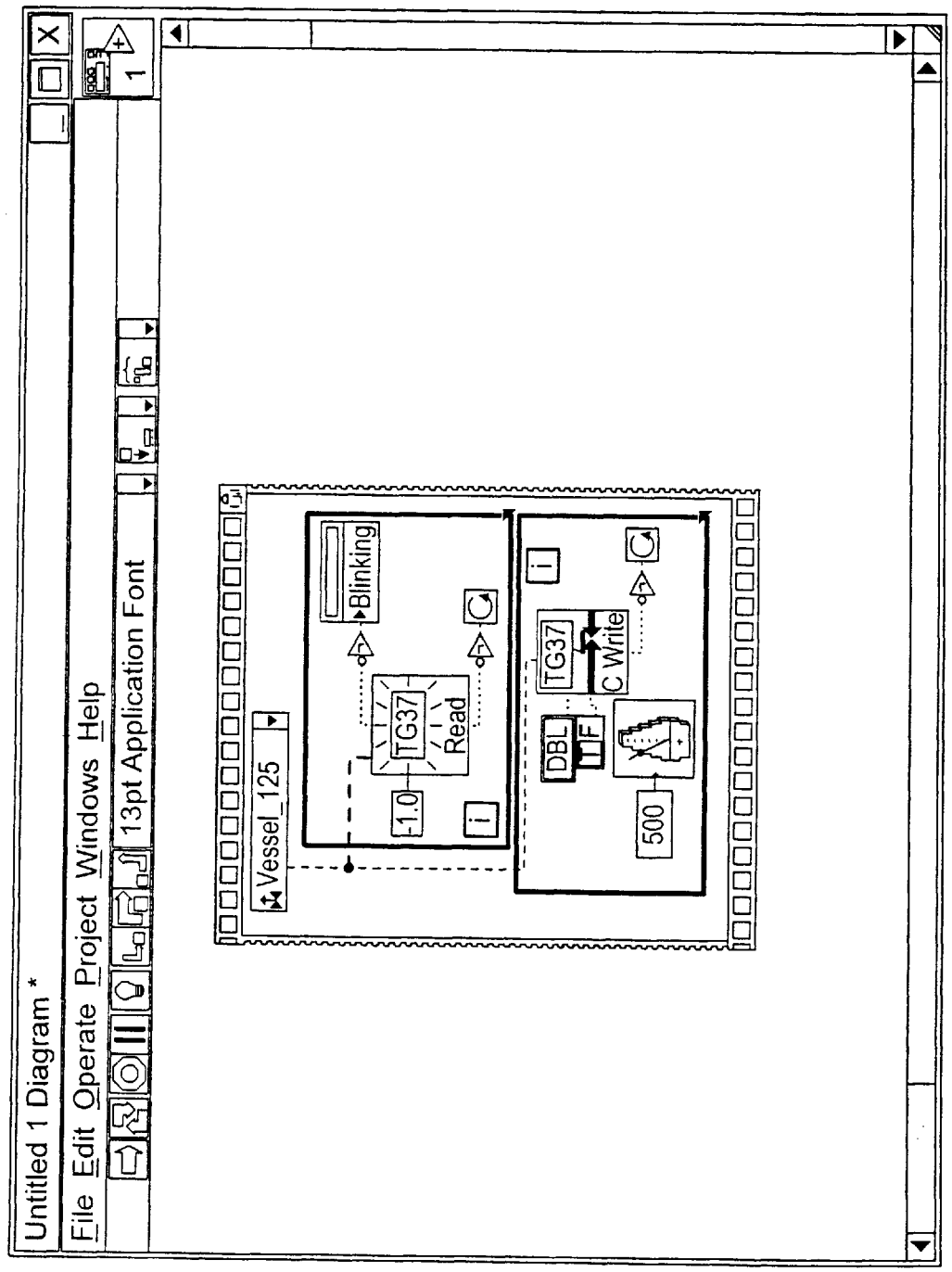
FIG. 31 illustrates a tag loop created in a block diagram in response to the numeric indicator configuration in FIG. 30.

In step 210 the graphical code generation wizard configures the graphical code portion with the one or more parameter values to produce a configured graphical code portion, also referred to as wizard created graphical code. In step 210, the graphical code generation wizard inserts the parameter values selected or configured by the user in step 206 into the graphical code portion or template selected in step 208. This involves inserting the parameter values into the respective locations in the graphical code portion or template. FIG. 30 illustrates an example of a configuration panel, and FIG. 31 illustrates the configured graphical code portion created in response to the configuration panel of FIG. 30.

In the preferred embodiment, the graphical programing system is configured whereby the user creates the graphical program in a graphical program panel, referred to as a block diagram window. In this embodiment, the graphical code generation wizard operates to copy the configured graphical code portion or template from the memory of the computer where the template is stored into the memory location where the graphical program being created resides. As a result, the graphical code generation wizard also causes the configured graphical code portion or template to be displayed in the block diagram window. In other words, the graphical code generation wizard operates to copy the configured graphical code portion or template into the block diagram window where the graphical program is being created. The configured graphical code portion comprises at least a portion of the graphical program being created.

Thus step 210 preferably comprises (1) configuring the graphical code portion with the one or more parameter values to produce a configured graphical code portion; (2) copying the configured graphical code portion or template into the memory where the graphical program being created resides; and (3) displaying the configured graphical code portion or template in the block diagram window. It is noted that the order of steps 1–3 above is not necessarily important, e.g., the graphical code portion or template may be copied into the graphical program memory prior to configuration with the parameter values, as desired.

In step 212 the graphical code generation wizard creates an association between the control and the configured graphical code portion. Creating the association preferably includes locking the association between the control and the configured graphical code portion, wherein the locking prevents user editing of the configured graphical code portion.

After the user has invoked the graphical code generation wizard to create a configured graphical code portion, the configured graphical code portion or wizard created code may form the entire graphical program being created, or may comprise a portion of a larger graphical program being created.

Editing a Configured Graphical Code Portion Created Using the Wizard

If the user later desires to edit wizard created graphical code created using the graphical code generation wizard, the user can either (1) invoke the graphical code generation wizard and make the desired changes using the configuration panel, or (2) unlock the configured graphical code portion and make the changes directly in the block diagram.

1. Using the Graphical Code Generation Wizard to Modify Graphical Code

Figure 3:
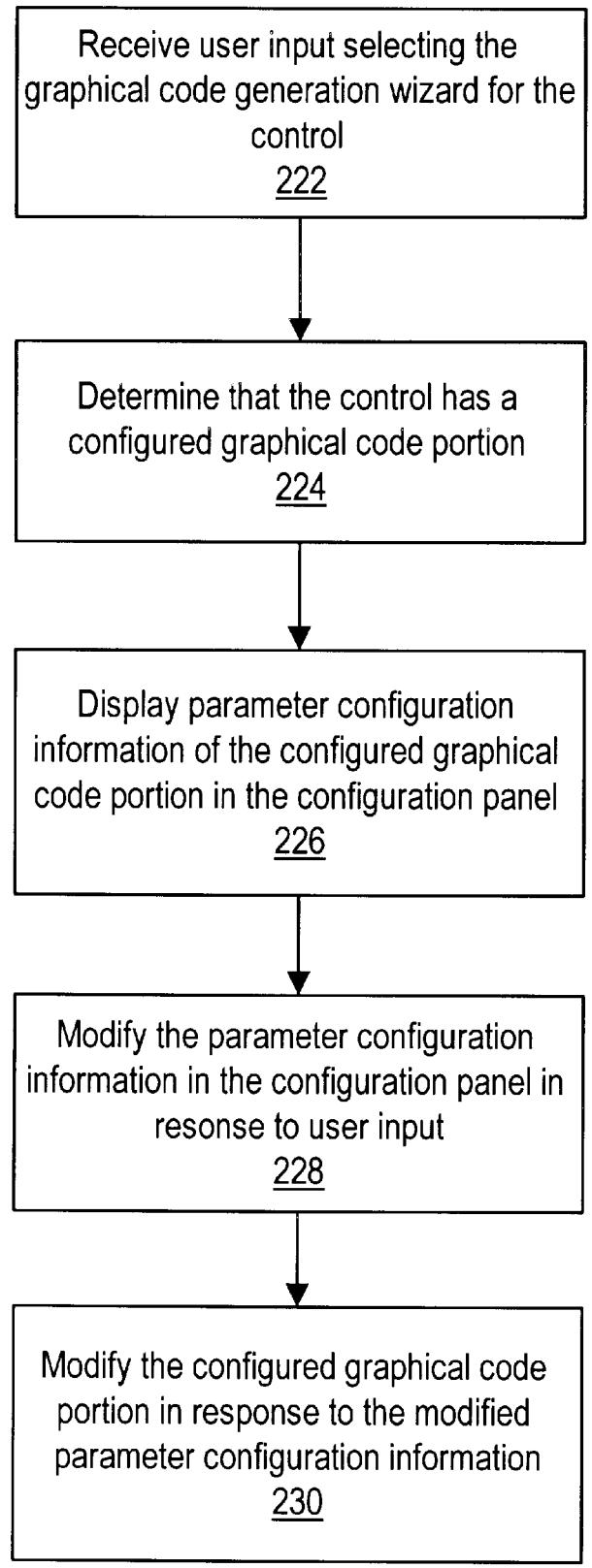
FIG. 3 is a flowchart diagram illustrating operation of modifying graphical code created with the graphical code generation wizard of the present invention.

FIG. 3 illustrates the first approach wherein the user invokes the graphical code generation wizard to make the desired changes to a configured graphical code portion created using the wizard. As shown, in step 222 the user initiates the graphical code generation wizard for the control and/or for the configured graphical code portion. This is done preferably by the user popping up on the control and selecting the graphical code generation wizard menu item. Alternatively, the user pops up on the configured graphical code portion in the block diagram window and selects the wizard menu item.

In step 224 the graphical code generation wizard determines if the control has associated wizard created graphical code. This flowchart presumes that the control does have associated wizard created graphical code, and thus the wizard here determines that the control has associated code. It is noted that if the control does not have associated graphical code, then steps 206–208 are executed as described above, and as shown in the flowchart of FIG. 4.

In step 226 the graphical code generation wizard displays parameter configuration information of the configured graphical code portion in the configuration panel in response to determining that the control has associated graphical code. In other words, in step 226 the graphical code generation wizard reads the parameter values configured or selected by the user in step 206 and displays these values to the user.

In step 228 the user modifies the parameter configuration information, i.e., the parameter values, in the configuration panel. Thus the user can change one or more parameter values on the configuration panel. Of course, if the user changes his/her mind at this point, the user can maintain the parameters with their present values.

In step 230 the graphical code generation wizard modifies the configured graphical code portion in response to the modified parameter configuration information. Modifying the configured graphical code portion in step 230 may involve selecting a new graphical code portion, if a changed parameter value necessitates a new graphical code portion.

Thus, using the graphical code generation wizard, the user can select new parameter values for a control which already has associated graphical code, i.e., a configured graphical code portion, and the wizard operates to configure the graphical code portion with the new parameter values to produce new graphical code.

It is noted that the graphical code generation wizard uses the association between the control and the configured graphical code portion to obtain and display the parameter values in step 226, to modify the parameter values in step 228 in response to user input, and also to configure the graphical code portion with the new parameter values in step 230. Also, after the user changes the configured graphical code portion using the wizard in steps 222–230, the association remains between the control and the new graphical code.

Figure 4:
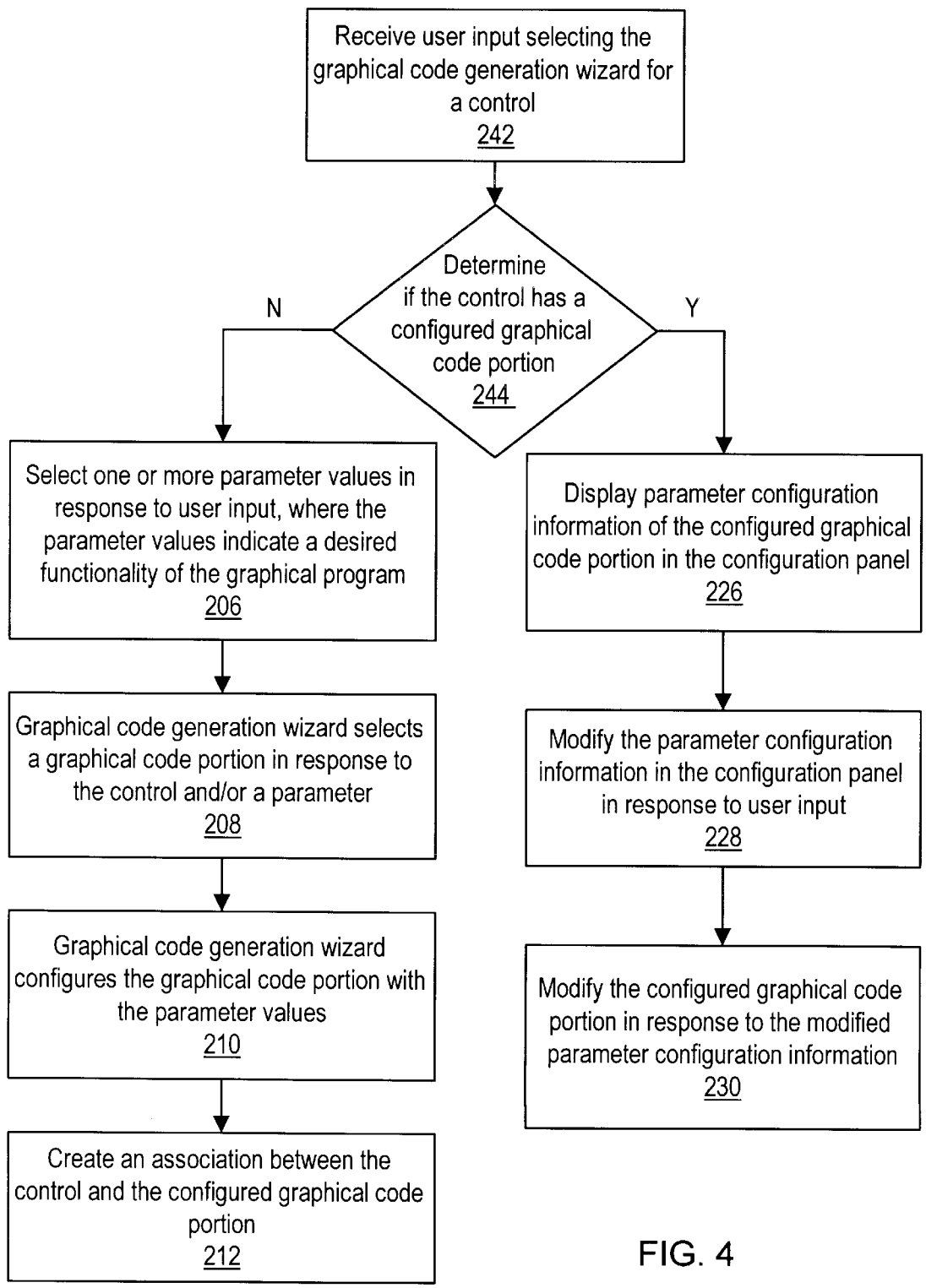
FIG. 4 is a more detailed flowchart diagram illustrating operation of the graphical code generation wizard of the present invention in creating or modifying code.

FIG. 4 illustrates a combination of the flowcharts of FIGS. 2 and 3. As shown, when selects the graphical code generation wizard for a control, e.g., "pops up" on a control and selects the wizard, the wizard in step 244 preferably first determines if the control has associated graphical code. If not, then steps 206–212 are performed as described above in FIG. 2. If the control already has associated graphical code as determined in step 244, then steps 226–230 are performed as described above.

2. Changing the Graphical Code Directly (Without the Wizard)

Figure 5:
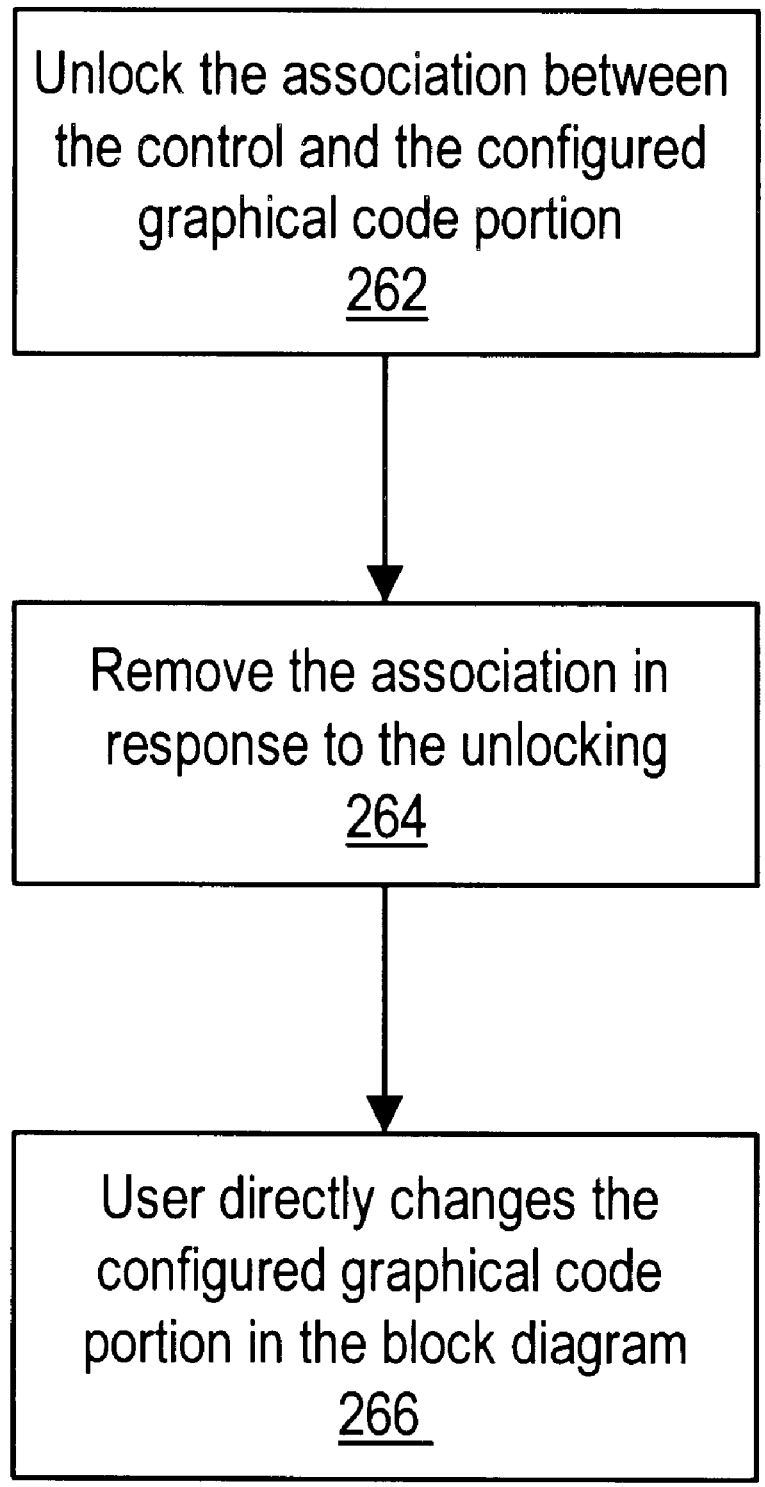
FIG. 5 is a flowchart diagram illustrating operation where the user directly modifies code created with the graphical code generation wizard of the present invention.

FIG. 5 illustrates the second approach above wherein the user chooses to unlock the configured graphical code portion and make the changes directly in the block diagram, instead of making the changes in the configuration panel using the wizard.

As shown, in step 262 the user unlocks the association between the control and the wizard created graphical code. In the preferred embodiment, a block diagram which includes wizard created graphical code includes a lock icon indicating the status of the lock. As shown in FIG. 31, the user pops up on the block diagram and selects a "Release Wizard Lock" option to unlock the association and allow direct editing of graphical code.

This unlocking in step 262 causes the wizard in step 264 to remove the association between the control and the configured graphical code portion. After the user unlocks the association in step 262, and the association is removed in step 264, in step 266 the user can change the configured graphical code portion directly in the block diagram window. In other words, after the user unlocks the association in step 262, in step 266 the user can directly change the configured graphical code portion, i.e., can directly edit the graphical code.

When the user changes the configured graphical code portion created using the wizard in this manner, then the association is preferably permanently removed. Thus, when the user selects the control which was previously associated with this code portion, the wizard can be used to create an entirely new graphical code portion, and the modified graphical code which was previously associated with this control remains in the program. In an alternate embodiment, the user can re-apply the association after editing the graphical code, assuming the changes to the graphical code meet certain criteria.

In one embodiment of the invention, the user can directly change wizard created graphical code and/or can directly change a template and can save the modified code as a new template. It is noted that, in the preferred embodiment, the new template created by the user cannot require a change to the configuration dialog or configuration panel.

Figure 6:
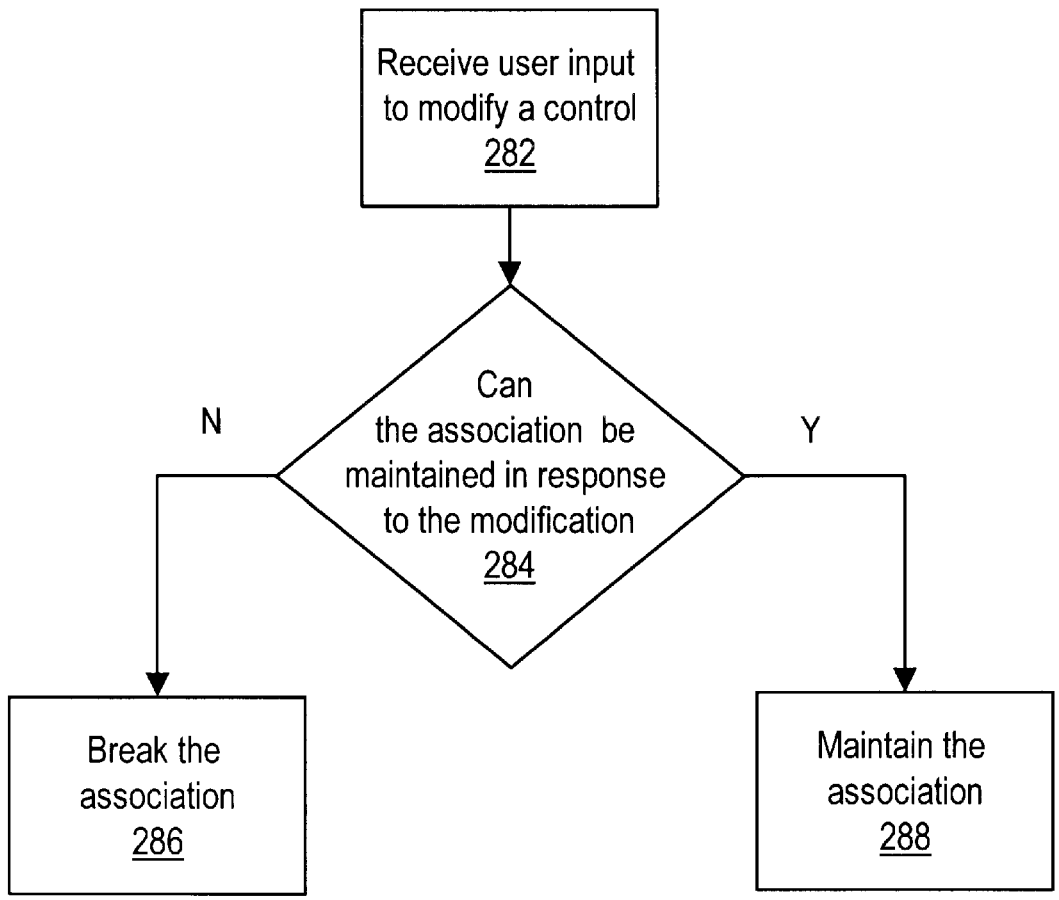
FIG. 6 is a flowchart diagram illustrating operation where the user modifies a control which has associated wizard created code.

FIG. 6—User Modifies a Control

FIG. 6 illustrates the preferred embodiment of the method wherein the user modifies or replaces a control on the front panel which has associated graphical code.

As shown, in step 282 the user provides input to modify a control. Here modification of a control includes changing the direction of the control, e.g., control to indicator or indicator to control, or replacing the control with a new control.

If the user enters input to modify a control which has associated graphical code, then in the preferred embodiment a warning is displayed to the user to remind the user that the control is associated with wizard generated code. If the user elects to proceed with the modification or deletion, then in step 284 the graphical code generation wizard determines if the association between the control and the code portion can be maintained in response to the modification. The determination of whether the association between the control and the code portion can be maintained preferably comprises examining the old and new types of the control, preferably the data types, and determining if the types are compatible.

If the association can be maintained, then the association preferably remains as shown in step 288. In this case, then the graphical program completes the operation and optionally re-invokes the wizard.

If the association can not be maintained in view of the user's modification, then in step 286 the wizard preferably breaks the association. In one embodiment, if the association can not be maintained, then In this case, the graphical code is preferably deleted. In this case, the wizard displays a dialog box informing the user that the code will be deleted before the actual control modification occurs. If the user pops up on the modified control and selects the graphical code generation wizard, the wizard can be used to create new code associated with the modified control.

In one embodiment, if the wizard determines that the association can not be maintained in view of the user's modification, then the wizard determines if another graphical code portion corresponds to the control. If so, the wizard provides the user with the option of generating new code for the modified control. If the user opts to allow the wizard to generate new code, then the wizard displays a dialog box for parameter configuration and selects a new graphical code portion or template which corresponds to the modified control.

If the user deletes the control or front panel object, the associated graphical code portion is automatically removed. If there is an associated graphical code portion, it is locked by the wizard and does not contain any user modifications, and thus it can be safely deleted.

Alternate Embodiments

In an alternate embodiment of the invention, there is no front panel object—graphical code association. If the user desires to reconfigure wizard created graphical code, the user is required to delete the old object and graphical code portion and invoke the wizard to create new graphical code.

In another alternate embodiment of the invention, the wizard does not include a wizard lock. Instead of the wizard lock approach, the graphical programming system detects user changes to a graphical code portion. Once the graphical programming system, e.g., LabVIEW, detects any changes, it automatically breaks the association.

Graphical Code Generation Wizard Architecture

In the preferred embodiment, the graphical code generation wizard is comprised in the LabVIEW graphical programming system available from National Instruments Corporation. The LabVIEW graphical programming system includes a graphical programming language referred to as G, and thus graphical program code is referred to below as G code. The following describes the architecture and configuration/implementation of the preferred embodiment of the graphical code generation wizard, as well as the graphical programming system which includes the graphical code generation wizard. It is noted that the graphical code generation wizard may be configured or implemented in a number of different ways. The following describes operation of one embodiment of the graphical code generation wizard, referred to as the MMI G Wizard, which is specifically for man-machine interface (MMI) applications.

The graphical code generation wizard, hereafter referred to as wizard, is a special graphical program or VI that is invoked by LabVIEW to generate graphical program code, also referred to as block diagram code. The graphical programming system which includes the wizard, e.g., LabVIEW, performs the following operations to enable operation of the wizard. As discussed above, this discussion presumes the preferred embodiment where the wizard VI provides a dialog interface for generating G code and where the wizard operates on a front panel object (control) and generates G code for the operated object.

The graphical programming system which includes the wizard, e.g., LabVIEW, supports the following operations to enable operation of the wizard:

1) Invoke the wizard: As mentioned above in step 204 (FIG. 2), invoking a wizard is preferably performed by popping up on the front panel object and selecting the wizard.

2) Generate G code: As mentioned above in steps 208 and 210 (FIG. 2), code generation for the operated object is performed by copy-pasting block diagram code from a template VI stored in computer memory. LabVIEW preferably provides a code interface node (CIN) hookup function to copy-paste block diagram contents of a template VI into another VI.

3) Lock generated G code from user changes: The present invention enables a user to invoke the wizard on an object a multiple number of times, wherein on each new invocation, the wizard replaces the old code with the new code. However, a problem arises if the graphical code is directly modified by the user in the block diagram without using the wizard. As mentioned above in step 212 (FIG. 2), the preferred solution to this problem is to lock the wizard code from direct user changes. The user, however, has the option to release the lock and directly modify the wizard generated code. When this occurs, the code is no longer identified as wizard code. Subsequent invocation of the wizard on the object generates new code, but the old code remains. In the preferred embodiment, the locking mechanism is provided only for code encapsulated in a structure node. For more details on locking, see the discussion related to FIGS. 29–30, below.

4) Associate wizard related data with the front panel object: A wizard capitalizes on this support by storing wizard state information with the front panel object. The state information can be retrieved and used on subsequent invocations. In the preferred embodiment, the wizard stores the state of the configuration panel dialog interface with the front panel object. Thus the next time the wizard is invoked on this object, the configuration panel dialog displays or reflects the most recent state or values of the parameters.

Wizard related data or configuration data is saved with a LabVIEW object utilizing an object referred to as Wizard Data. This object includes the following information:
 Identification of the Wizard which created it.
 Version information
 Node List—used for maintaining a link to block diagram code (eg: tag loop).
 Flat data—this is flattened data supplied by the Wizard, only the wizard can interpret the contents.

Wizard Data provides a convenient way to associate wizard related data with an object and make it persistent. The hook functions GetWizardData and SetWizardData let CINs access the Wizard Data. Wizard Data also provides a link between the front panel-object and block diagram code which is used by MMI Wizard to specify the front panel object-to block diagram code segment.

The following describes the manner in which a graphical programming system which includes the wizard, e.g., LabVIEW, interacts with wizards, the wizard registration process and the design of wizards.

The graphical programming system which includes the wizard, e.g., LabVIEW, interacts with the wizard under the following conditions:

1) When a wizard is explicitly invoked by the user popping up on a front panel object.

2) When the user modifies a wizard operated front panel object linked to locked code. This includes the following options: a) When the user replaces a wizard operated front panel object linked to locked code with a new object; b) When the user changes the direction of a wizard operated front panel object linked to locked code; c) When the user deletes a wizard operated front panel object linked to locked code.

As noted above, replacing or changing the front panel object may break the association between the wizard generated G code and the corresponding object or control. LabVIEW asks the wizard for approval to perform the replacement and passes in the old and new types of the control. If the types are identical or compatible, then the wizard approves, and LabVIEW modifies the front panel object, maintains the current configured code, referred to as wizard code, and maintains the association between the configured code and the object. If the types are not identical and/or incompatible, then the wizard disapproves, and the wizard displays a dialog warning the user that the associated code will be deleted. If the user chooses to continue with the modification of the control, then LabVIEW modifies the front panel object, removes the association between the wizard code and the object, and deletes the wizard code. The user is then free to re-invoke the wizard to generate new code for the modified object.

In the case of a deleted object, the association with the wizard generated G code is automatically removed, and the code is deleted.

The interaction between the graphical programming system which includes the wizard, e.g., LabVIEW, and the wizard uses the following protocol:

The wizard preferably comprises two entry points, the Wizard VI and the Confirm VI. The principal purpose of the Wizard VI is to generate G code. The Wizard VI operates by calling back into LabVIEW using a sub-VI called Copy Template.vi. Optionally, the Wizard VI stores wizard specific data with the object on which the wizard was invoked using a sub-VI called Set Wizard Data.vi. The wizard data is retrieved by calling a sub-VI called Get Wizard Data.vi. These VIs are discussed further below.

As discussed, the Wizard VI is invoked by LabVIEW for the following reasons:

1) (Preferred) The User invoked the wizard by popping up on the front panel object.

2) (Alternate Method) The User invoked the wizard by selecting a front panel object from a palette comprising objects which have corresponding graphical code portions or templates.

3) (Optional) A wizard operated front panel object was replaced by another object. The wizard VI is optionally automatically invoked to generate new code for the replaced object if possible.

4) (Optional) The direction of a wizard operated object was changed from indicator to control or vice versa. The wizard VI is optionally automatically invoked to generate new code if possible.

Figure 7:
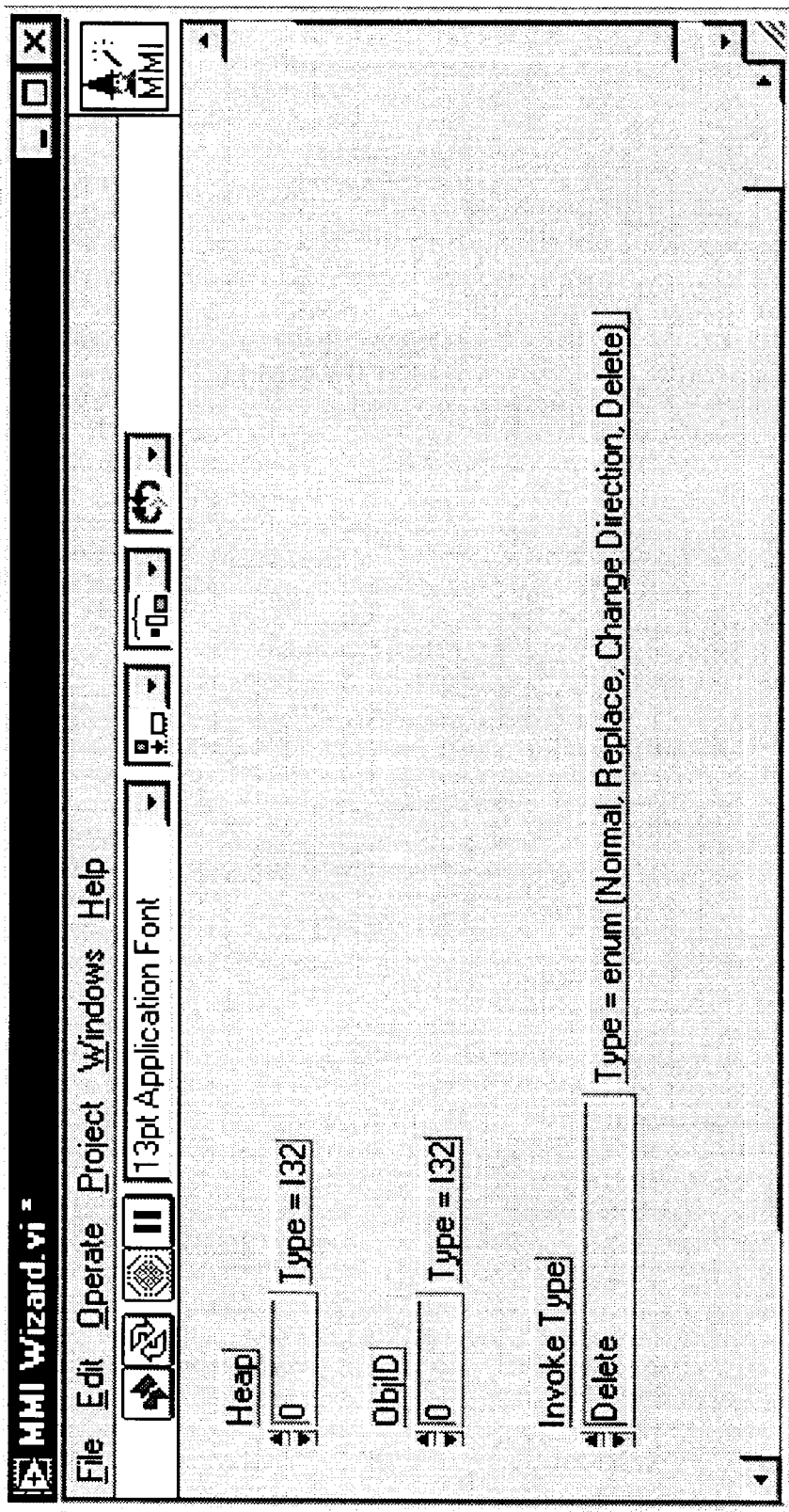
FIG. 7 illustrates the front panel controls of the Wizard VI.

FIG. 7 illustrates the front panel of the Wizard VI. Referring now to FIG. 7, in the preferred embodiment the Wizard VI includes the controls "Heap", "ObjID", and "Invoke Type".

The Heap and ObjID controls identify the front panel object in which the wizard is to be invoked. The values of Heap and ObjID are preferably not modified by the wizard in any way. Rather, the Heap and ObjID controls are passed to callback VIs, discussed further below, which perform the copying of templates and setting and getting of wizard data.

The "Invoke Type" control informs the wizard the reason why the wizard is being invoked. In an embodiment where the wizard is only invoked for one reason, i.e., the user popping up on a control, this field is always the same. In the preferred embodiment which includes other methods for invoking the wizard, this field takes on various values for the different ways of invoking the Wizard VI described above. In this embodiment, the "Invoke Type" control has the following values, 0-normal, 1-replace, 2-change direction, and 3-delete. The normal case is in response to user invocation as mentioned above. The replace and change direction values indicate invocation after a front panel object replacement or front panel object direction change, respectively. In the preferred embodiment, the wizard VI is not invoked with the delete option.

Figure 8:
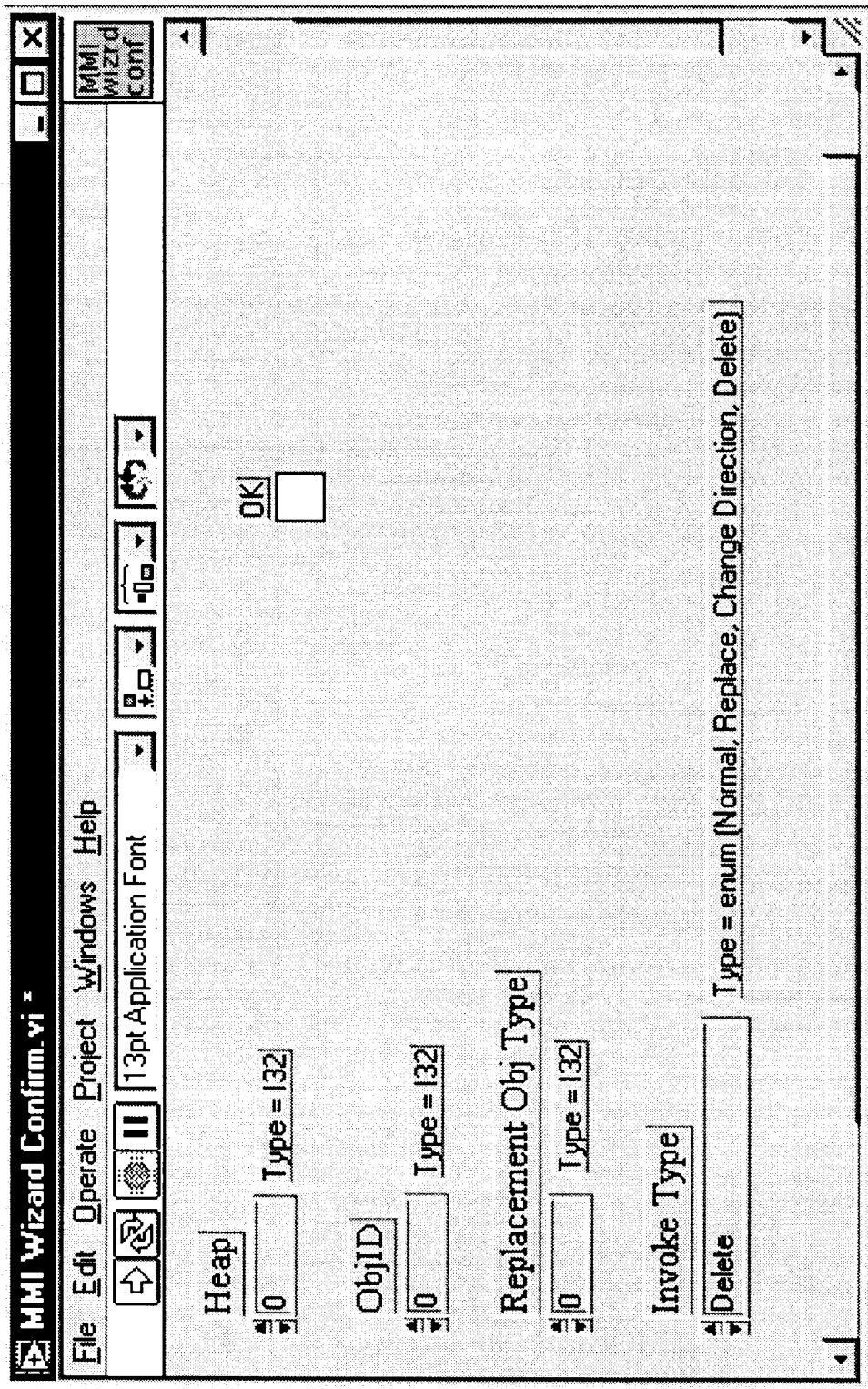
FIG. 8 illustrates the front panel controls and indicators of the Confirm VI.

Referring now to FIG. 8, the second entry point, referred to as "Confirm VI", is invoked by LabVIEW to query the wizard whether it is acceptable to maintain an association after a certain operation is performed on a wizard operated front panel object linked to locked code. These operations are replace, change direction and delete.

As shown in FIG. 8, the confirm VI includes the following controls and indicators: Heap, ObjID, Replacement Object Type, Invoke Type, Type, and OK.

The Heap and ObjID controls identify the front panel object on which a replace, change direction, or deletion is being performed. The values of Heap and ObjID are not modified by the Confirm VI in any way, but rather are passed to code interface nodes (CINs) in the Wizard VI.

The Invoke Type control informs the Confirm VI the reason why the Confirm VI is being invoked. The Invoke Type control has the following values: 0-normal, 1-replace, 2-change direction, 3-delete. These values are used by the Confirm VI prior to a front panel object replacement or direction change to query the Wizard whether the association between the control being changed and the code associated with the control can be maintained. As noted above, when a control or front panel object is deleted, the association is automatically broken.

The control "Replace ObjType" indicates the type of the object with which the current object will be replaced. The "Replace ObjType" control comprises an ID value which is unique for a LabVIEW object. FIG. 9 illustrates a table which shows the ID values of certain of the front panel objects. The value of the "Replacement ObjType" control is valid only with the replace option. The object id of the object specified by "Heap" and "ObjID" is obtained by calling the Get ObjType.vi discussed further below.

The purpose of the Confirm VI is to examine the object id of the object or control and either 1) the replacement type (if this is a replace operation) or 2) the change direction (if this is a change direction operation), and determine if the association can be maintained between the new modified control and the configured graphical code portion associated with this control. The Confirm VI sets the value of the Boolean indicator OK to true or false to indicate its response (i.e., to indicate whether the association can or cannot be maintained). In the preferred embodiment, the Confirm VI generates a warning to the user prior to changing the wizard operated control as indicated by the user. If the user opts to proceed, then the Confirm VI generates either a true or false value. If the Confirm VI sets the OK value to true, then LabVIEW completes the operation and re-invokes the wizard using the Wizard VI if the operation was a replace or a change in direction. However, on a delete operation, LabVIEW deletes the object and the associated code if the Confirm VI returns true. If the Confirm VI returns false, LabVIEW maintains the status quo and does nothing. In this case, the user is required to delete the associated graphical program portion before performing the desired edit.

In another embodiment of the invention, the secondary purpose of the Confirm VI is to invoke the Wizard VI if necessary to generate new code associated with the changed or modified control. It is noted that the Confirm VI is never invoked with the normal option.

In the preferred embodiment, the controls in FIGS. 7 and 8 are referenced by the graphical programming system, e.g., LabVIEW, by name. However, these controls may be referenced in any of a plurality of different ways.

Registration of Wizards

In the preferred embodiment, Wizard programs are registered with the graphical programming system in which they are incorporated, e.g., LabVIEW, in order to enable the programming system to know about the existence of the Wizard. In the preferred embodiment using the LabVIEW graphical programming system, LabVIEW includes a directory under vi.lib referred to as "Wizard" which includes a Wizard registry file, having a .wiz extension for each of the available Wizards. When LabVIEW loads, LabVIEW reads these files and registers the wizards.

Figure 10:
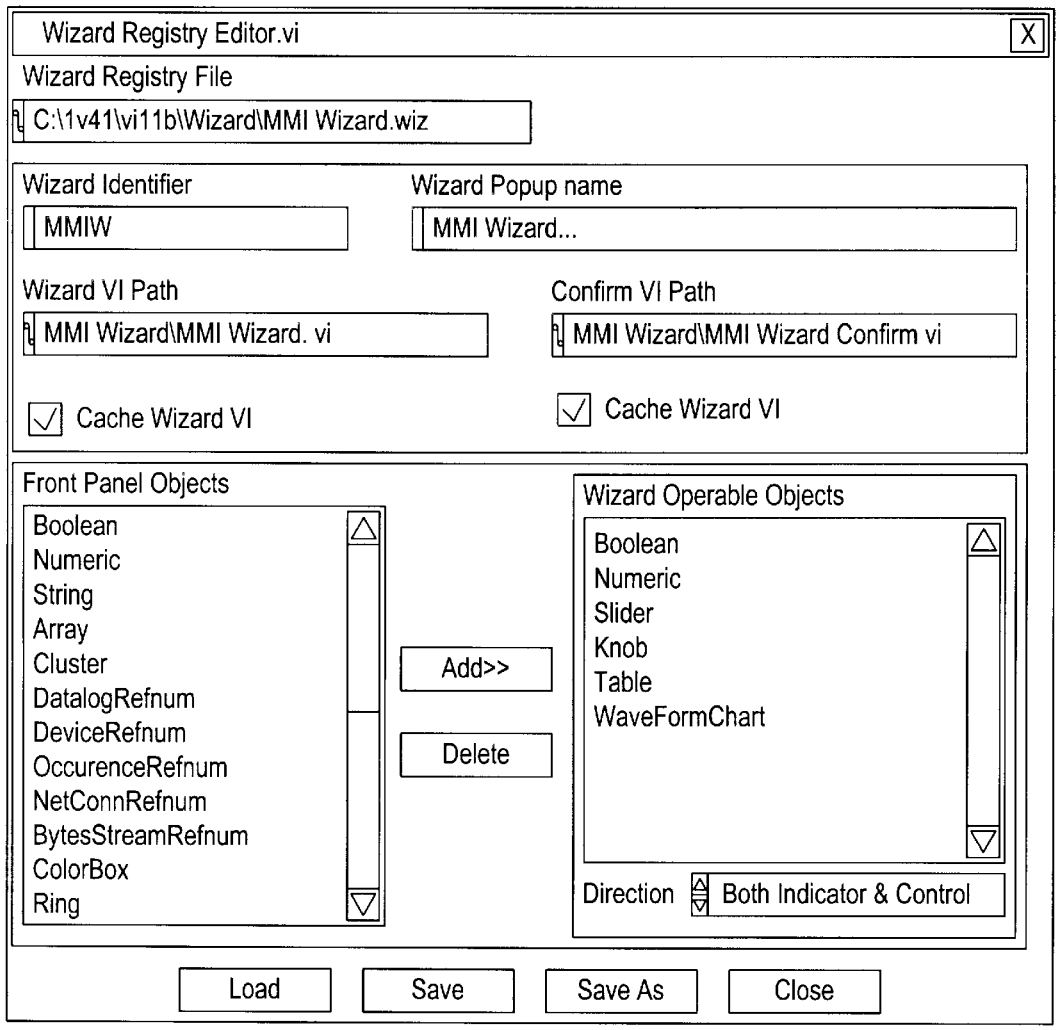
FIG. 10 illustrates the Wizard registry editor for creating a Wizard registry file.

A wizard registry file for a wizard is created using a tool called the Wizard Registry Editor. The Wizard Registry Editor is shown in FIG. 10. The Wizard Registry Editor provides a simple interface for building a wiz registry file. The various components are described below:

Wizard Registry File: Stores the full path of the wizard registry file.

Wizard Identifier: The unique 4 letter identifier of the wizard, e.g., MMIW.

Wizard Popup Name: This name appears on the pop-up menu of a front panel object.

Wizard VI Path, Confirm VI Path: Path names of the Wizard VI and Confirm VI, respectively. These paths include the names of the wizard VI and Confirm VI and are specified relative to the "Wizard" directory. For example, if the Wizard VI is named "MMI Wizard.vi" and is located in a directory named "MMI Wizard" below the "Wizard" directory, then the Wizard VI Path should be "MMI Wizard\MMI Wizard.vi".

Cache Wizard VI, Cache Confirm VI: When these are checked, the respective VIs are loaded the first time they are invoked and cached in memory until LabVIEW quits.

Front Panel Objects: These are the LabVIEW front panel objects.

Wizard Operable Objects: These are the front panel objects which are operable by the wizard. The Add button is used to select a front panel object and add the object to this list. Front Panel Objects can also be added to this list by double clicking on them. The Delete button deletes a selected item from this list.

Direction: This specifies an item in the Wizard Operable Objects to be applicable to both controls and indicators, only indicators, or only controls by choosing the direction.

When the wizard registry file is completed, the file is saved in the "Wizard" directory.

The ".wiz" files are read by LabVIEW at initialization time. The wizard name is added to the popup menu of the objects supported by the wizard. When the user selects the Wizard item from the object's popup menu, LabVIEW runs the Wizard VI specified in the ".wiz" file and waits for completion.

As noted above, in one embodiment the system includes a plurality of graphical code generation wizards which are user selectable based on the desired application. The system and method of the present invention preferably includes the above method for initializing the graphical programming system with a plurality of graphical code generation wizards. The plurality of graphical code generation wizards are first stored in the memory of the computer system. Files corresponding to each of the graphical code generation wizards are then stored in a directory. The graphical programming system is then initialized, which includes reading the files in the directory corresponding to each of the graphical code generation wizards. The names of the graphical code generation wizards are then added to a menu in response to the initialization, and the names of the graphical code generation wizards are selectable by a user.

Developing Wizard and Confirm VIs

Figure 11:
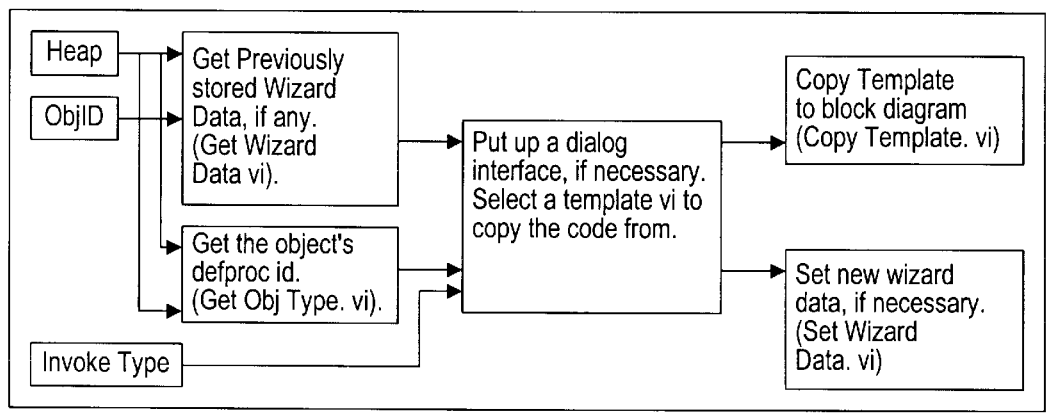
FIG. 11 illustrates a typical data flow diagram for a Wizard VI.

As discussed above, the principal purpose of the Wizard VI is to copy G code from a template VI into the block diagram of the wizard operated object. A typical data flow diagram for a Wizard VI will generally resemble the diagram shown in FIG. 11. Appendix 1 of the present application includes source code of a fully operational graphical program of a wizard, referred to as the MMI G Wizard.

The Wizard VI includes a VI referred to as Get Obj Type.vi to obtain the type of the object on which it is operating. The VI Get Obj Type.vi operates to obtain an object's type or defproc id, which is a unique identifier for each LabVIEW object. Based on the type of the object and the Invoke Type, the Wizard VI displays different dialog interfaces. After receiving input from the user, the Wizard VI selects a template VI, i.e., a graphical code portion or template.

The VI Copy Template.vi is called to perform the copy-pasting of G code comprised in the template VI into the block diagram window where the user is operating. The Copy Template VI provides options to initialize the values of the constants and selectively replace attribute nodes in the copied code.

The Wizard VI calls a VI referred to as Set Wizard Data.vi to associate wizard related state information (wizard data) as a flattened string with the front panel object by calling Set Wizard Data.vi.

The Wizard VI calls a VI referred to as Get Wizard Data.vi to retrieve wizard data from a front panel object. The state information is normally used to remember the dialog states.

Figure 12:
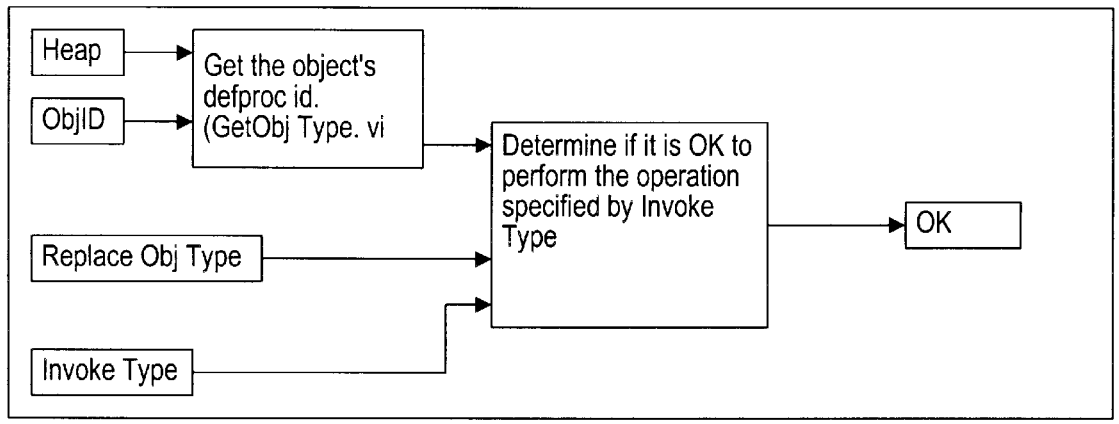
FIG. 12 illustrates a typical data flow diagram for a Confirm VI.

As discussed above, the purpose of the Confirm VI is to determine whether an association can be maintained after an operation is performed on a wizard operated front panel object linked to locked code. FIG. 12 illustrates a typical data flow diagram for a Confirm VI. The Confirm VI examines the current type and the future type of an object and determines if it is possible for the wizard to maintain the association in view of the operation. The value OK is set to TRUE if the association can be maintained, i.e., if the current type and future type (data type) of the object are compatible. Examples of where the current type and future type of an object are deemed to be compatible are: numeric to numeric, string to string, Boolean to Boolean, etc. If the operation results in loss of the association, the Confirm VI warns the user of the impending danger. It is noted that the determination of whether current and future types are compatible is preferably wizard dependent.

The following is a more detailed description of the VIs or graphical programs that are used in creating wizards. These Vis call back into the graphical programming system, e.g., LabVIEW, to operate on an object specified by Heap and ObjID. Heap and ObjID are provided by LabVIEW at the time of invoking the Wizard and are preferably never modified by the Wizard.

Figure 13:
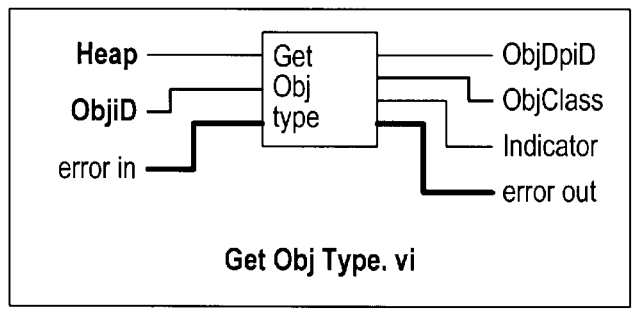
FIG. 13 illustrates the icon representing the Get Object Type VI.

FIG. 13 illustrates the Get Obj Type VI. The Get Obj Type VI retrieves the unique LabVIEW id of an object. FIG. 9 comprises a list of ids. The Get Obj Type VI includes inputs of Heap, ObjID and error in, and includes outputs of ObjDpID, ObjClass, indicator and error out. The output ObjDpID refers to the unique id. The output ObjClass refers to the class to which the object belongs. This class information is not presently used, and is present for future use. The output Indicator is TRUE to denote that the object is of indicator type and is FALSE to denote that the object is of control type.

Figure 14:
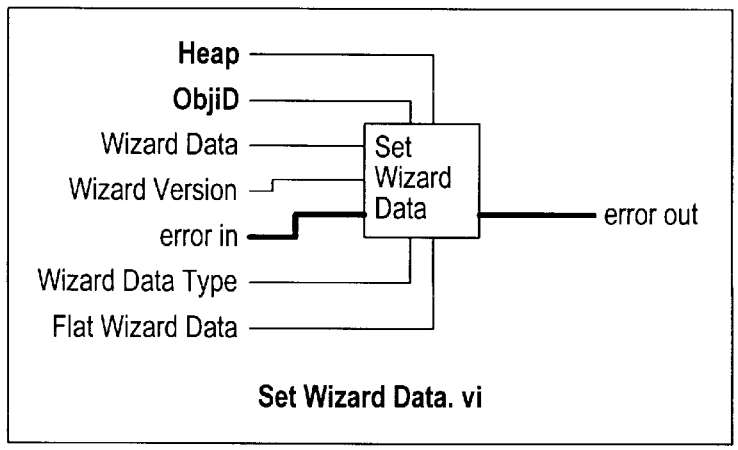
FIG. 14 illustrates the icon representing the Set Wizard Data VI.

FIG. 14 illustrates the Set Wizard Data VI. The Set Wizard Data VI allows a wizard to store a flattened string of wizard related data with the wizard operated object specified by Heap and ObjID. The Set Wizard Data VI includes inputs of Heap, ObjID, Wizard ID, Wizard Version, error in, Wizard Data Type, and Flat Wizard Data, and includes a single output called error out. The Wizard ID and Wizard Version inputs are 32 bit integers (I32s) and they uniquely identify a particular version of the wizard. If Wizard ID is set to zero (it is zero by default), any previously stored wizard data for that object is flushed. Flat Wizard Data is the actual flattened string of Wizard related data. Wizard Data Type is an identifier for the type of data stored in Flat Wizard Data.

Figure 15:
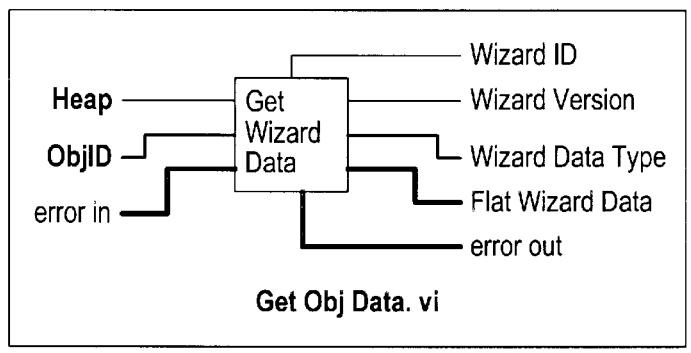
FIG. 15 illustrates the icon representing the Get Wizard Data VI.

FIG. 15 illustrates the Get Wizard Data VI. The Get Wizard Data VI includes inputs of Heap, ObjID, and error in, and includes outputs of Wizard ID, Wizard Version, Wizard Data Type, Flat Wizard Data, and error out The Get wizard Data VI retrieves the wizard data of an object specified by Heap and ObjID. The Wizard ID and Wizard Version are 32 bit integers (I32s) and they uniquely identify a particular version of the wizard. If there is not any wizard data stored with the object, Wizard ID is set to 0. Flat Wizard Data is the actual flattened string of Wizard related data. Wizard Data Type is an identifier for the type of data stored in Flat Wizard Data, it can be used by the wizard to unflatten Flat Wizard Data.

Figure 16:
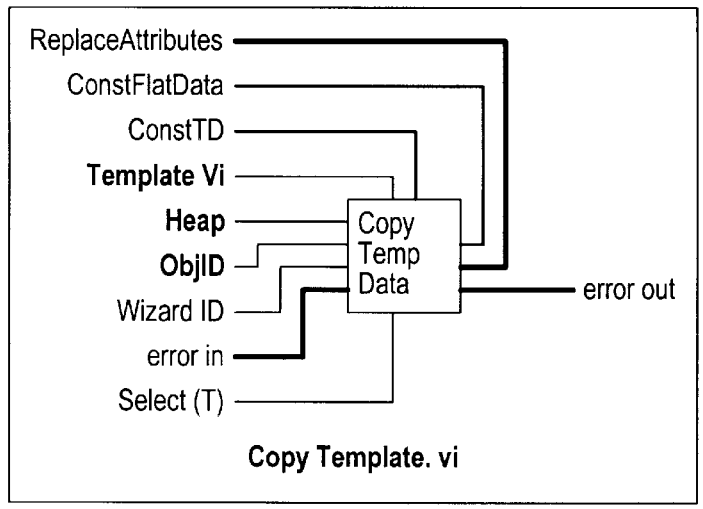
FIG. 16 illustrates the icon representing the Copy Template VI.

FIG. 16 illustrates the Copy Template VI. The Copy Template VI includes inputs of ReplaceAttributes, ConstFlatData, ConstTD, Template VI, Heap, ObjID, Wizard ID, error in, and Select (T), and includes an error out output. The Copy Template VI generates code for an object specified by Heap and ObjID by copying block diagram code from the respective Template VI. If Wizard ID is specified and non-zero, Copy Template tries to lock the copied code. In the preferred embodiment, the locking works only if the copied code is encapsulated in a structure node. Wizard IDs are four lettered code, like "MMIW" which is packed into an I32. A utility VI called "4 Letter Code to I32.vi" performs the conversion from string format to I32.

Thus the Copy Template VI copies the diagram objects from the template VI into the block diagram and also initializes the constants. The Copy Template VI takes in a cluster (in type descriptor & flattened string format) containing a list of labelled controls bearing the initial values for the constants. Constants are assigned values from controls which match their label. Copy Template also provides an option for replacing one attribute with another. This is especially useful for color attributes, wherein the user can replace the "BackGround Color" with "Fill Color" to fine tune the template. The Copy Template VI replaces the front panel term in the template diagram with the front panel term of the object on which the wizard was invoked. Once the copying is complete, an object/block diagram portion association is set up.

Figure 17:
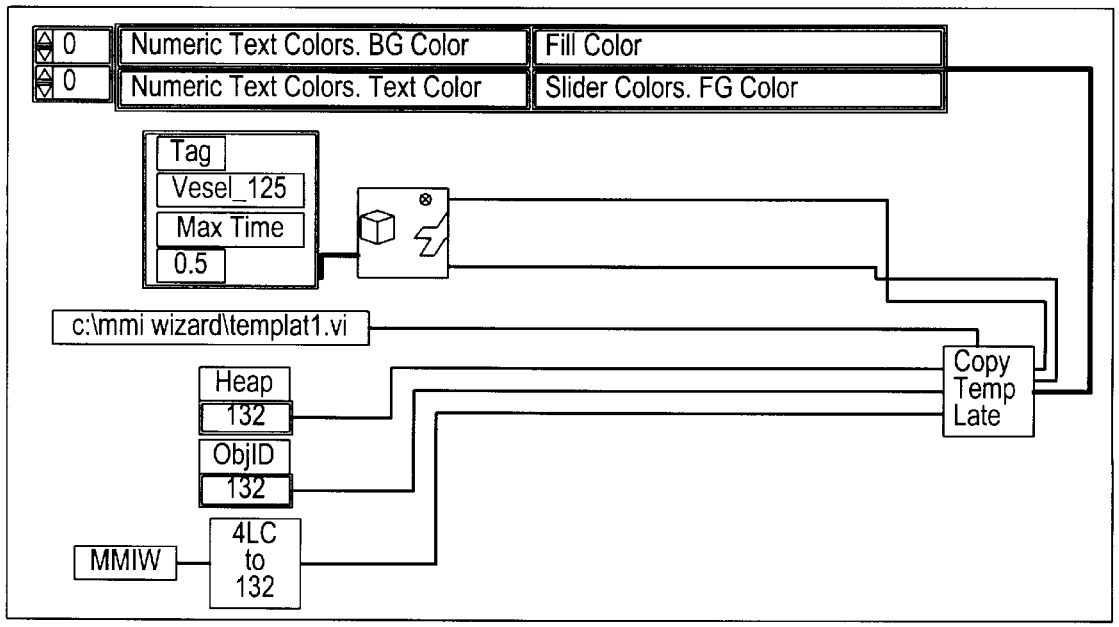
FIG. 17 illustrates a block diagram of graphical program to initialize constants in wizard created graphical code.

As mentioned above, the Copy Template VI provides an option to initialize the constants in the copied code. The values of the constants are supplied in a cluster to Copy Template as shown in FIG. 17. To set the values of constants Tag and Max Time in copied code, a cluster is created with items named Tag and Max Time. The cluster items are then set to the required values, flattened and passed to Copy Template as a type descriptor (ConstTD) and flattened string (ConstFlatData) pair.

The Copy Template VI also provides an option to replace one attribute with another. The replacement attributes are specified in a 2D array of strings. The first column contains the original attribute name and the second column contains the replacement attribute name. The attribute name is preferably in full, dotted format as shown in FIG. 17. Also, the Select option (default TRUE) determines if the copied code remains selected (highlighted) or not.

Graphical Code Generation Wizard Example: MMI Wizard

The following is an example of a graphical code generation Wizard according to the preferred embodiment of the present invention. This example is referred to as the MMI Wizard. The graphical source code of the MMI Wizard is included in Appendix 1, and the graphical source code of the template VIs used by the MMI Wizard are included as Appendix 2.

The MMI Wizard is used for MMI/SCADA applications (man machine interface/supervisory control and data acquisition). MMI/SCADA applications range from the graphical user interface (GUI) to control and monitor industrial automation applications to advanced data analysis, visualization and real time applications controlling chemical processes or factory machinery, among others. In MMI/SCADA applications, data values or real world I/O points are referred to as tag values.

In the preferred embodiment, the MMI Wizard example is comprised in the BridgeVIEW graphical programming system available from National Instruments Corporation. As mentioned above, BridgeVIEW incorporates LabVIEW graphical programming functionality, including G code graphical programming. MMI/SCADA applications such as BridgeVIEW typically include a real time data base which comprises an in-memory snapshot of all tags in the system.

In order to configure or create an industrial automation application, it is generally necessary to configure tag attributes of the tags or data being acquired. Examples of tag attributes include tag names, servers, and devices used, historical logging, scaling, or alarm limits and priority. After device level configuration and configuration of the tags, it is then necessary to create a MMI application which performs the functionality of controlling and/or monitoring the tag values.

In the BridgeVIEW graphical programming system of the preferred embodiment, in order to create an MMI application, the user first creates a front panel interface for monitoring and/or controlling the process. This involves placing various front panel objects e.g., either controls and/or indicators, in a front panel or user interface panel, and also optionally various symbols which represent various types of devices. This interface is used to interact with the tags or real-world I/O points and view the status of the functions being performed.

Once the front panel has been created, the user associates the front panel objects with the tags in the system. According to the preferred embodiment of the invention, the user preferably uses the MMI Wizard of the present invention.

The MMI Wizard provides an easy dialog interface for enabling a user to generate repetitive pieces of diagram code. The MMI Wizard also provides immense help for novice G programmers to build simple tag monitoring loops.

A typical industrial automation diagram is a collection of independent loops monitoring one or more tag values. Because these loops are very similar, the user is generally forced to perform several repetitive tasks. The MMI Wizard alleviates this problem by automating the process of generating tag monitoring and control loops (tag loops, in short). The MMI Wizard provides a user friendly interface to associate a front panel control/indicator with a tag and generate the necessary tag loop for a given configuration.

In the preferred embodiment, the MMI Wizard operates on seven types of LabVIEW front panel objects:

Numeric Indicators—Analog Input

Numeric Controls—Analog Output

Boolean Indicators—Discrete Input or Discrete Alarm

Boolean Controls—Discrete Output or Discrete Alarm Acknowledgement

Table Indicators—Alarm Summary or Event History

Waveform Chart Indicators—Real-Time Trend

XY Graph—Historical Trend

Whenever the MMI Wizard is invoked on one of these front panel objects, a MMI Wizard dialog appears for that object. The user associates the front panel object with a tag and sets the various configuration parameters. The wizard maintains a collection of template VIs that contain tag monitoring loops for all possible configurations. When the user selects the MMI Wizard for a control and configures parameters for the desired function, the wizard selects a template VI, from which the tag loop is extracted and pasted on the block diagram.

User Interface Considerations

1. Wizard Invocation

Figure 18:
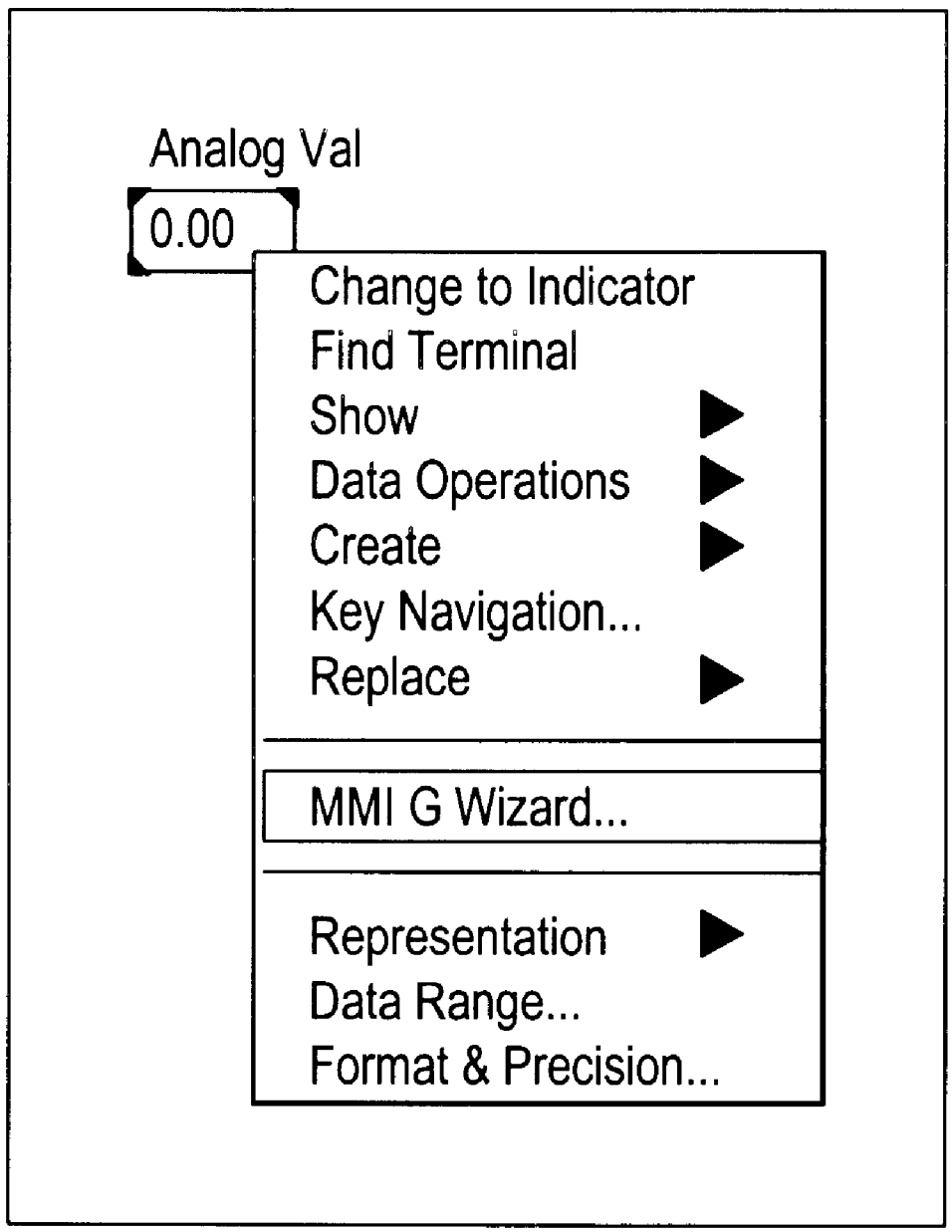
FIG. 18 illustrates a user invoking the graphical code generation Wizard by popping up on a Wizard operable front panel object and selecting the "MMI Wizard . . . " item.

As shown in FIG. 18, in the preferred embodiment, the user pops up on a Wizard operable front panel object, such as the "Analog Val" object shown in FIG. 18, and selects "MMI G Wizard . . . " to invoke the wizard.

Figure 19:
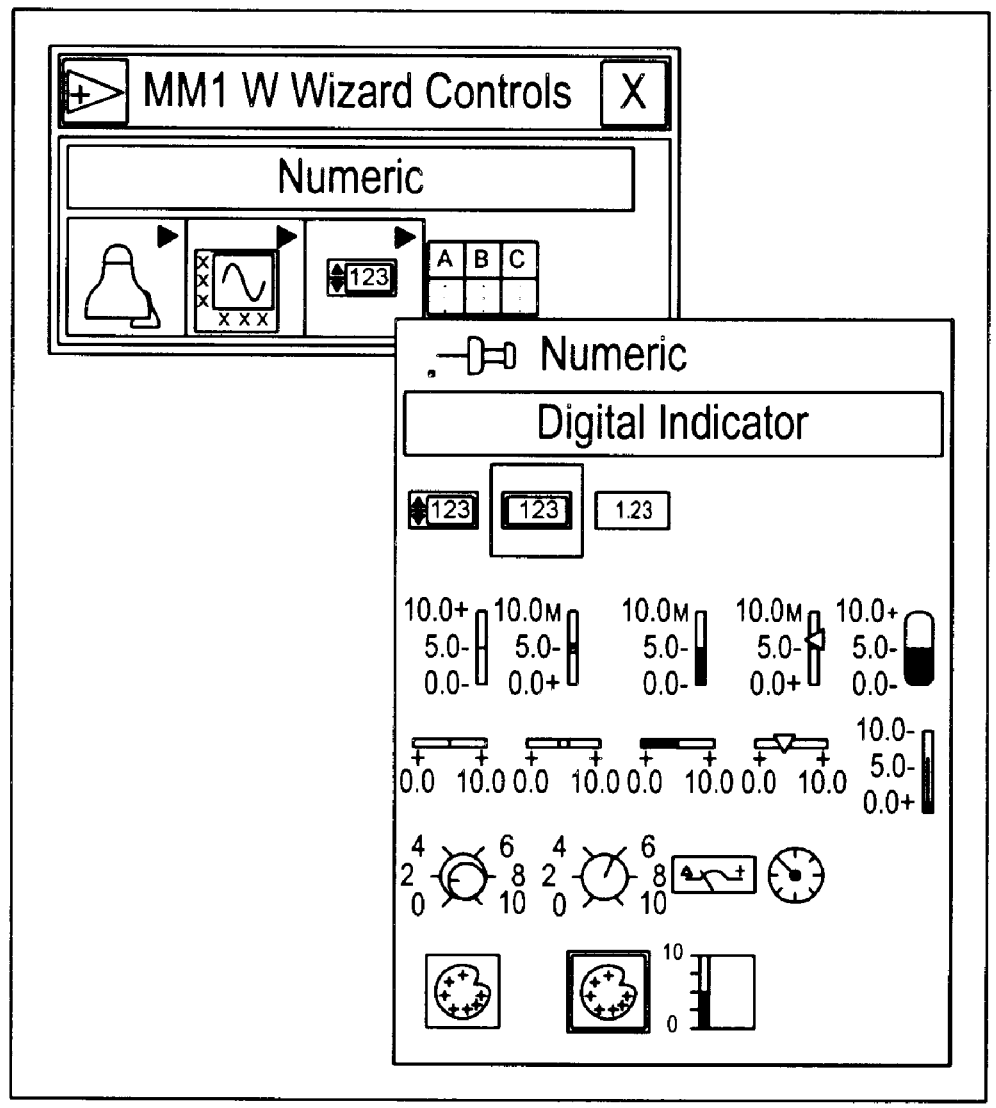
FIG. 19 illustrates an alternative method of invoking the MMI Wizard by selecting an object from a special control palette dedicated for objects that are operable by the MMI Wizard.

In another embodiment, as shown in FIG. 19, the graphical programming system includes a separate control palette comprising objects or controls that are operable by the MMI Wizard. On selecting an object from this palette and dropping it on the front panel, MMI Wizard is automatically invoked on the object. For example, as shown in FIG. 19, when the user selects a digital indicator (Analog Input) from the Wizard palette and drops it on the front panel, the MMI Wizard is automatically invoked.

In either method, the pop-up method is also used to invoke the wizard to reconfigure a front panel object that has an associated wizard created graphical program.

Wizard Interface

When the MMI Wizard is invoked, the Wizard displays a configuration dialog which allows the user to associate the front panel object with a tag. In the preferred embodiment, the seven types of wizard operable objects are configured differently, and thus a different configuration dialog appears for each of the seven objects. The dialog interface for each of the seven objects is shown in FIGS. 20–28.

Figure 20:
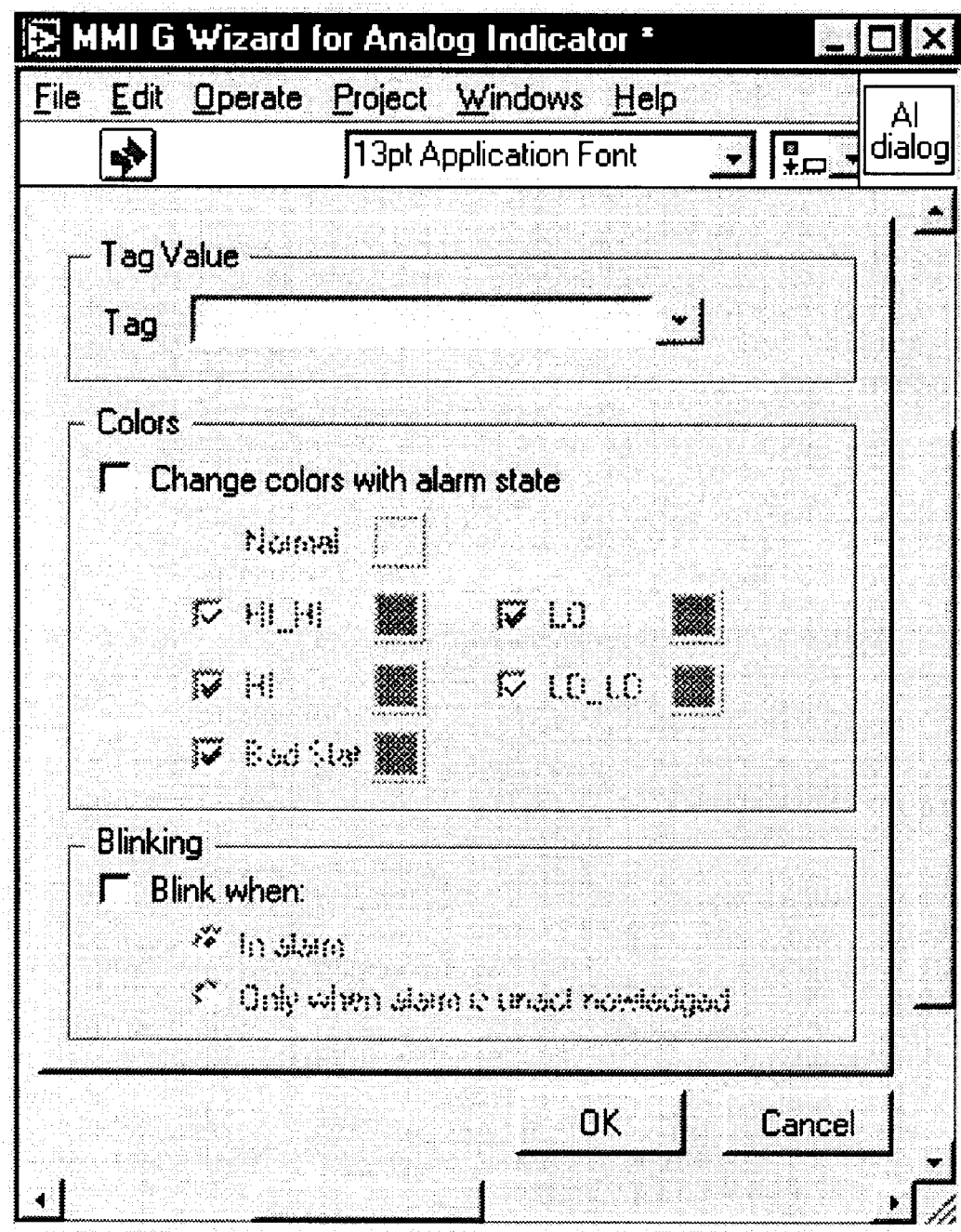
FIGS. 20–29 illustrate dialog boxes or configuration panels for various different types of controls and indicators that are displayed by the MMI Wizard in the preferred embodiment.

FIG. 20 illustrates the dialog box for a Numeric Indicator. The MMI Wizard for a numeric indicator lets the user associate a tag value with the indicator. The user can also set the color and blinking options under alarm conditions.

Figure 21:
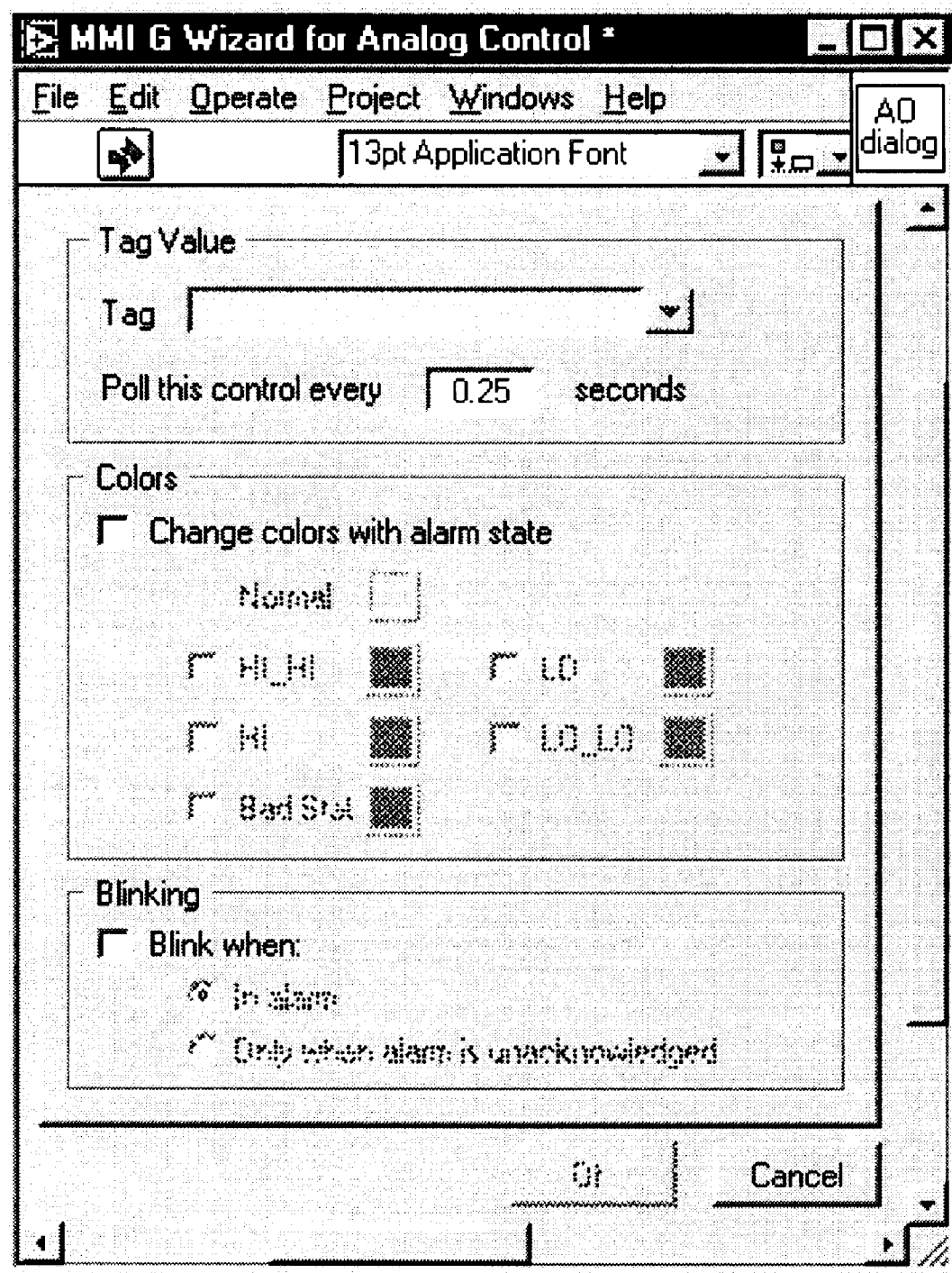

FIG. 21 illustrates the dialog box for a Numeric Control. The MMI Wizard for a numeric control lets the user associate a tag value with the control. The user can set the colors, blink options under alarm conditions and specify the time period for polling this control value.

Figure 22:
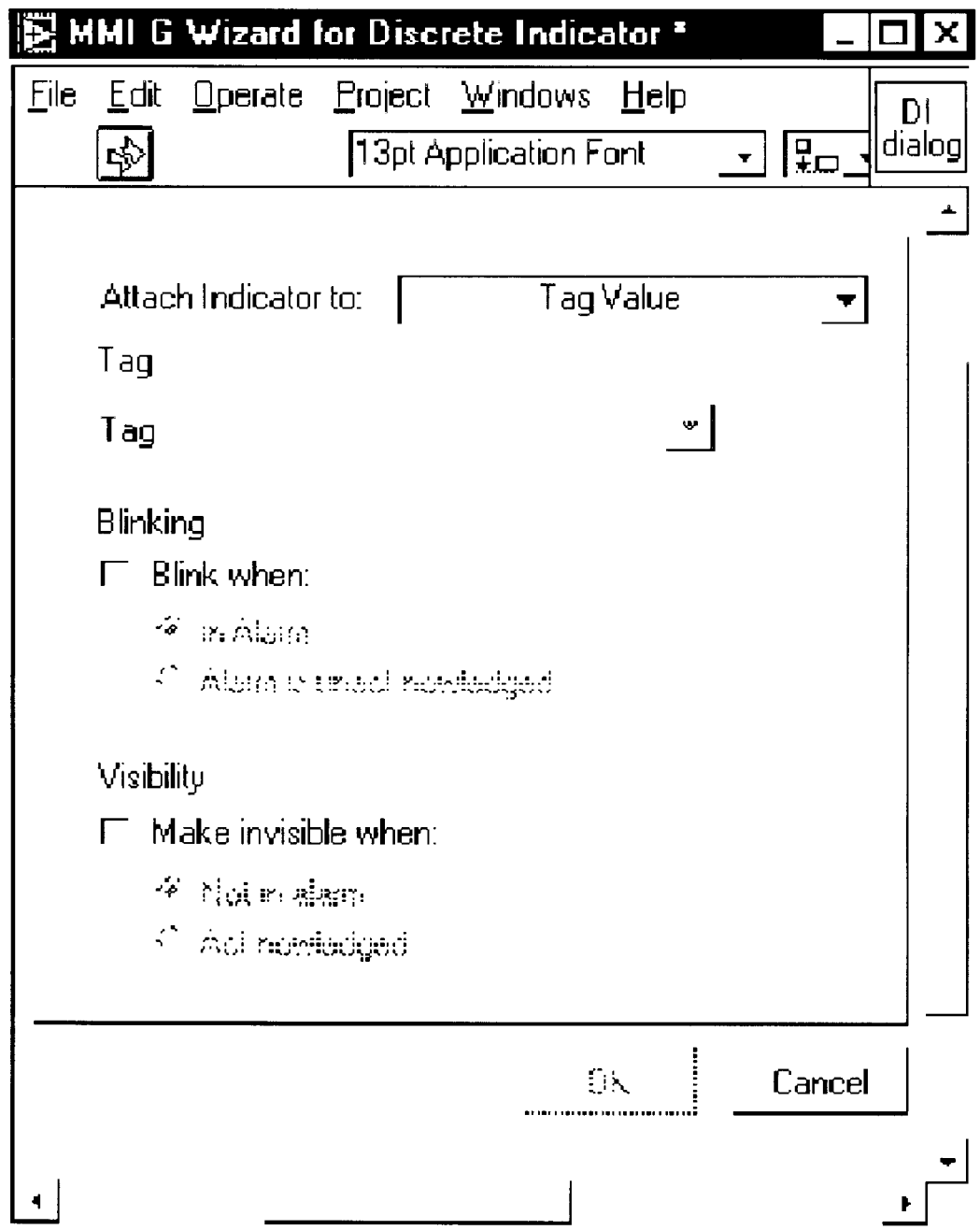
Figure 23:
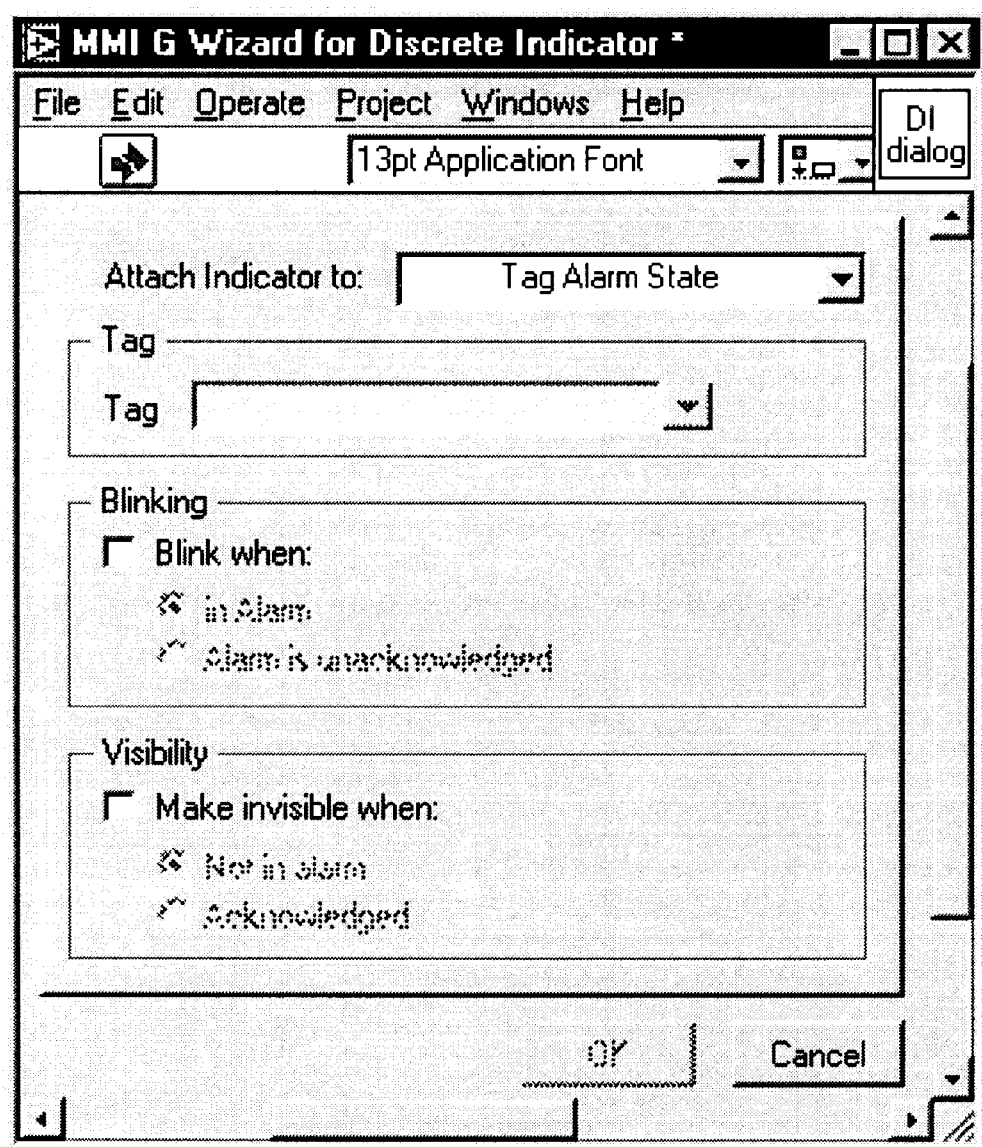

FIGS. 22 and 23 illustrate dialog boxes for a Boolean Indicator for a Discrete Input or Discrete Alarm. The MMI Wizard is invoked on a Boolean indicator to associate the indicator with a tag's value (Discrete Input) or alarm state (Discrete Alarm).

Referring now to the Discrete Indicator dialog of FIG. 22, when the MMI Wizard is invoked for the first time on a Boolean indicator, the configuration dialog is set for Discrete Input. The user can associate the tag's value with the indicator and set blink and color options under alarm conditions. Changing the value of "Attach Indicator to:" ring to Tag Alarm State changes the indicator association from tag's value to tag's alarm state.

Referring now to the Discrete Alarm dialog of FIG. 23, the user associates a tag's alarm state with a Boolean indicator by setting the value of "Attach Indicator to:" ring to Tag Alarm State and selecting a valid tag. Secondary options allow the user to change colors, blink properties and visibility of the indicator under different alarm states.

Figure 24:
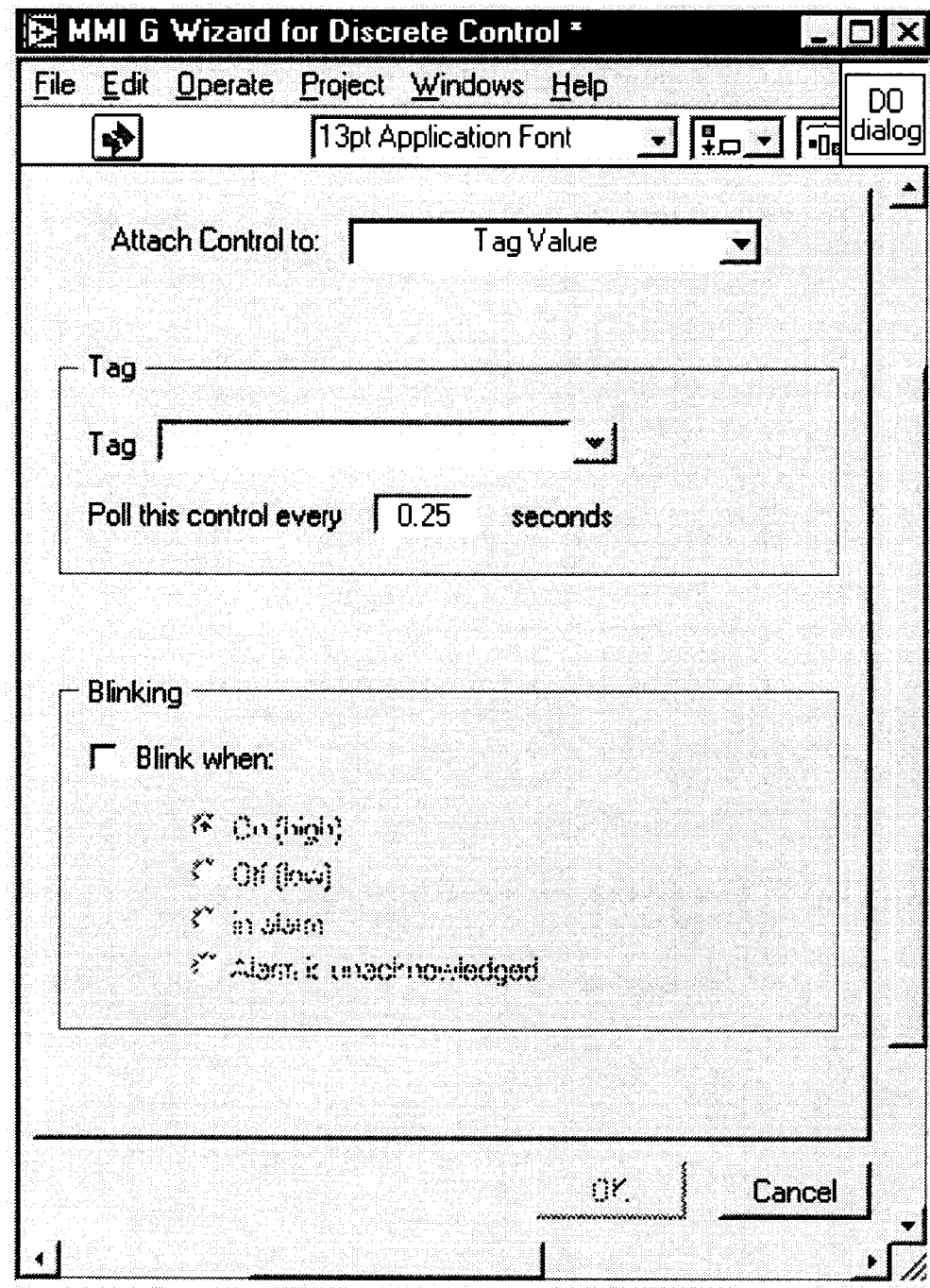
Figure 25:
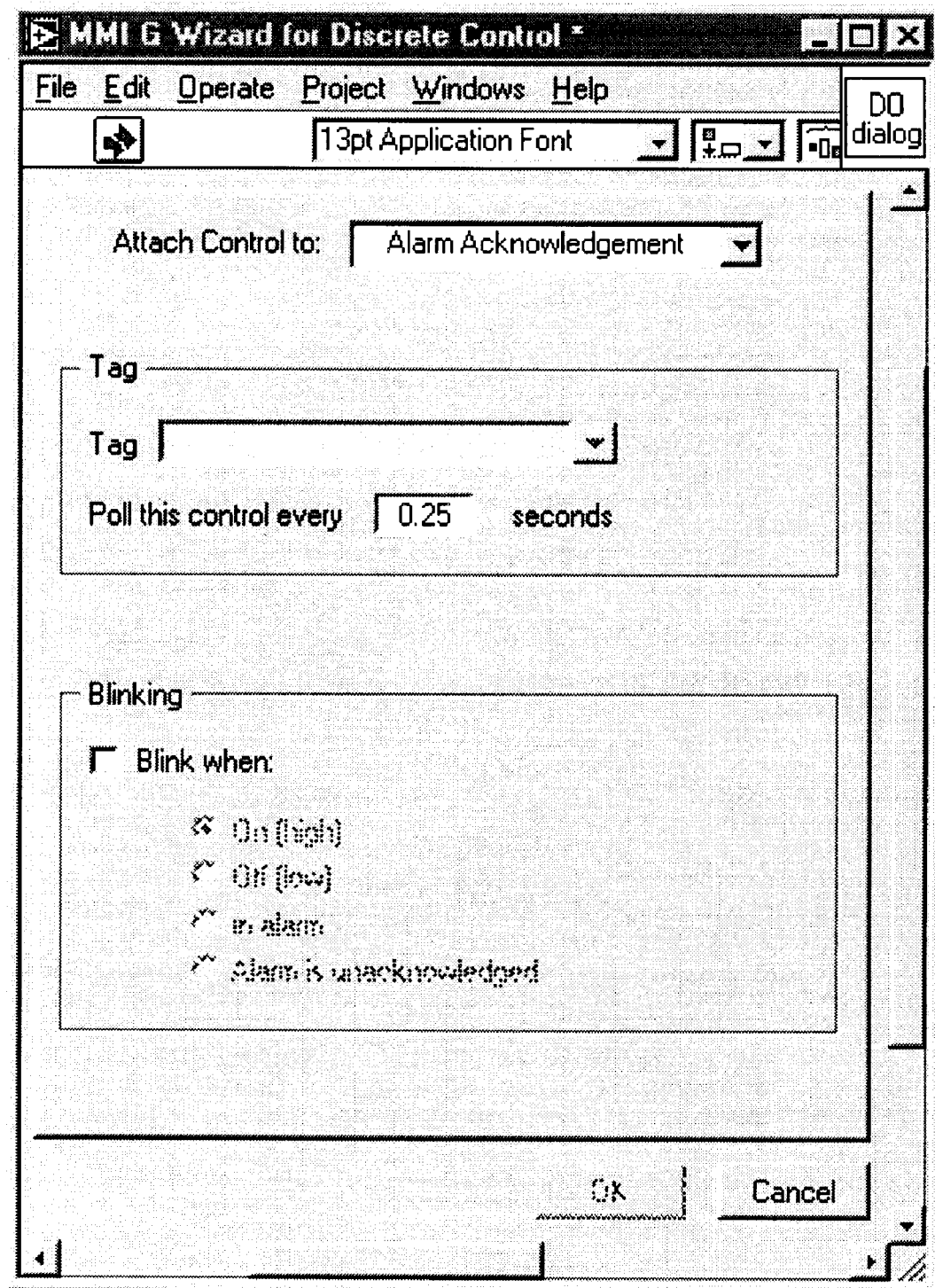

FIGS. 24 and 25 illustrate the dialog boxes for a Boolean Control for Discrete Output and Discrete Alarm Acknowledgment. The MMI Ward is invoked on a Boolean control to associate the control with a tag's value (Discrete Output) or alarm acknowledgment state (Discrete Alarm Ack).

Referring now to the Discrete Output dialog of FIG. 24, when the MMI Wizard is invoked for the first time on a Boolean control, the configuration dialog is set for Discrete Output. The user can associate the tag's value with the control and set blink and color options under alarm conditions. Changing the value of the "Attach Control to:" ring to Alarm Acknowledgement changes the control association from the tag's value to alarm acknowledgement.

Referring now to the Discrete Alarm Acknowledgement dialog of FIG. 25, the MMI Wizard is set to Alarm Acknowledgement mode by setting the value of the "Attach Control to:" ring to Alarm Acknowledgement. The user selects a set of tags which require acknowledgement whenever the control's value is set to TRUE by the user. Selecting a tag and pressing the "Add" button adds a tag to the list. Selecting a tag from the list and pressing the "Delete" button deletes the tag from the list Other options allow the user to set blink and visibility properties under different conditions.

Figure 26:
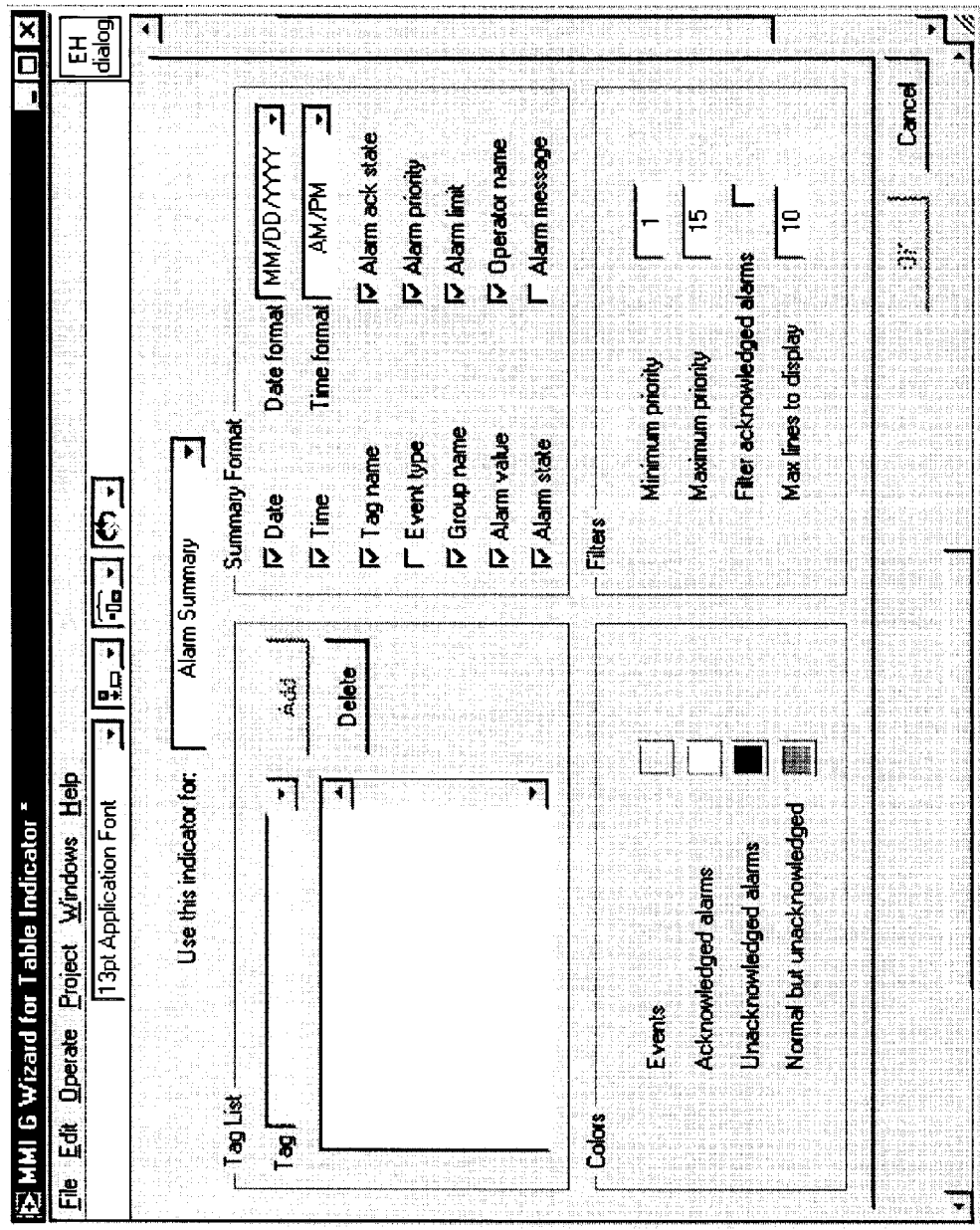
Figure 27:
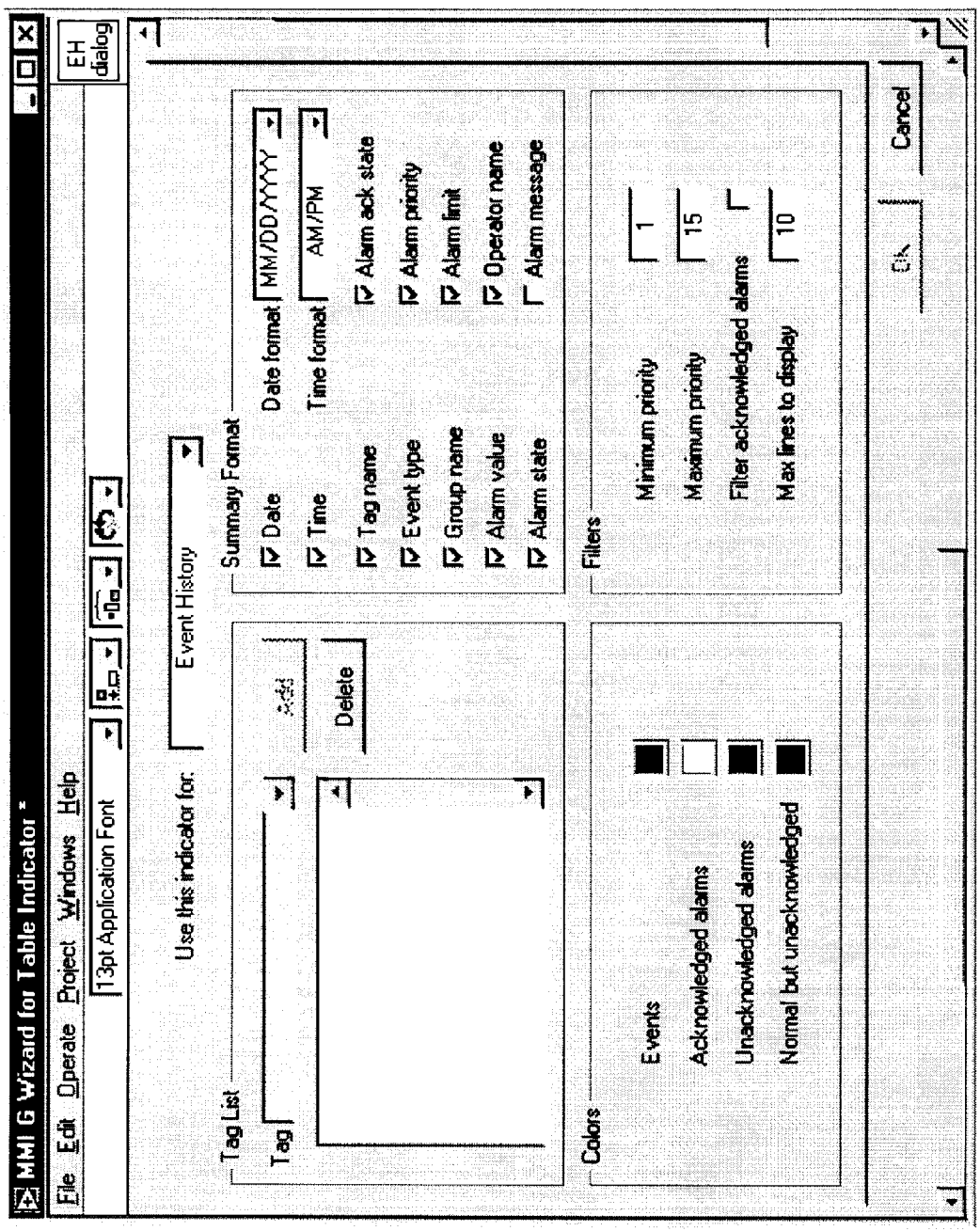

Referring now to FIGS. 26 and 27, dialog boxes for a Table Indicator are shown. The MMI Wizard is invoked on table indicators to obtain either a summary of current alarms (Alarm Summary—FIG. 26) or a history of past events and alarms (Event History—FIG. 27).

As shown in the Alarm Summary dialog of FIG. 26, the MMI Wizard is set to Alarm Summary mode by setting the value of the "Use this Indicator for:" ring to Alarm Summary. The user selects a set of tags whose alarms require monitoring. Selecting a tag and pressing the "Add" button adds a tag to the list. Selecting a tag from the list and pressing the "Delete" button deletes the tag from the list. Other options allow the user to set colors of acknowledged and unacknowledged alarms, set the column format and the sort type of the summary.

As shown in the Event History dialog of FIG. 27, the MMI Wizard is set to Event History mode by setting the value of the "Use this Indicator for:" ring to Event History. The user selects a set of tags whose history needs to be displayed. Selecting a tag and pressing the "Add" button adds a tag to the list. Selecting a tag from the list and pressing the "Delete" button deletes the tag from the list. Other options allow the user to set colors of acknowledged alarms, unacknowledged alarms, normal and event entries, set the column format and the sort type of the summary.

Figure 28:
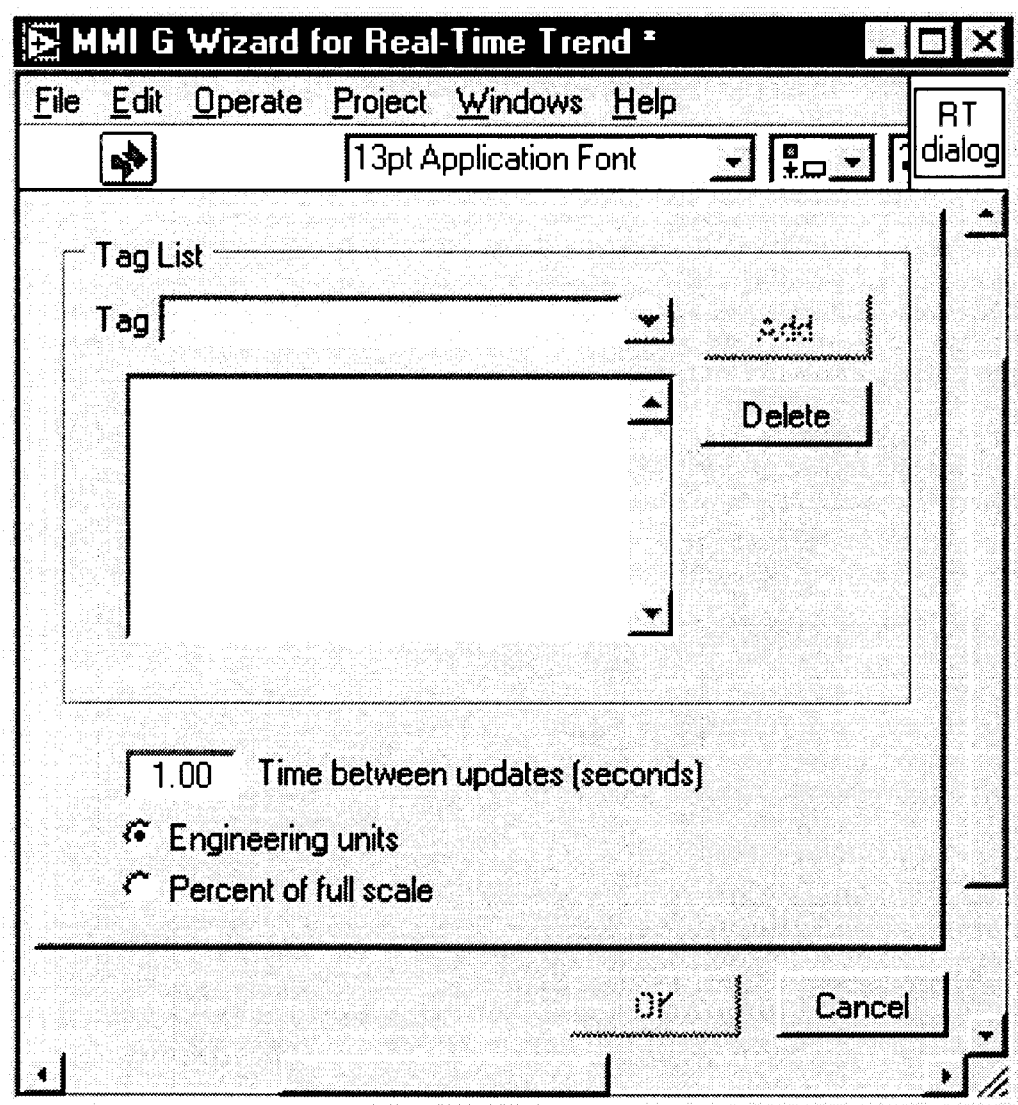

Referring now to FIG. 28, the dialog box for a Waveform Chart Indicator (Real-Time Trend) is shown. The MMI Wizard for a Real-Time Trend allows the user to select a set of tags whose values need to be displayed in a chart Selecting a tag and pressing the "Add" button adds a tag to the list. Selecting a tag from the list and pressing the "Delete" button deletes the tag from the list.

Figure 29:
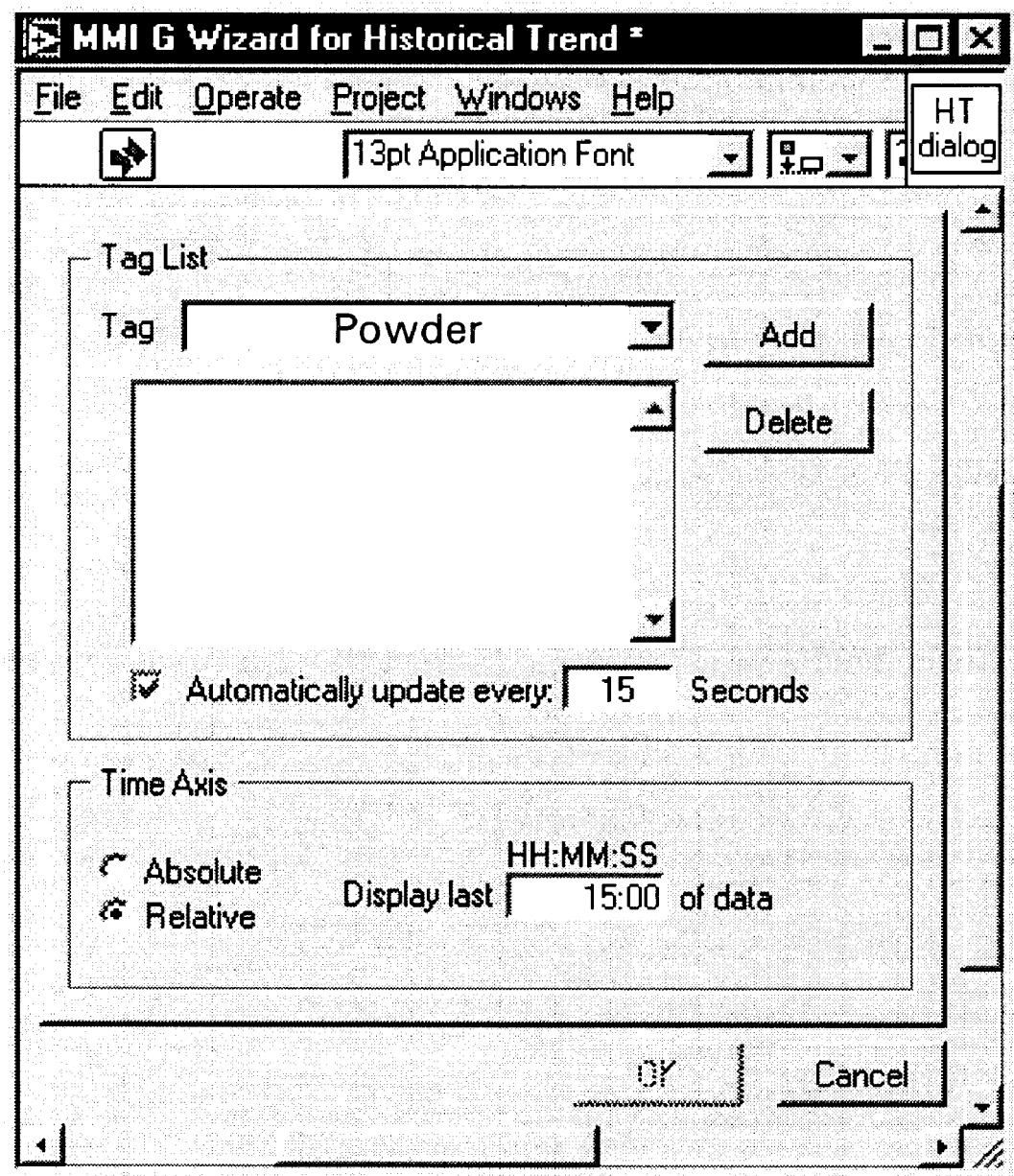

FIG. 29 illustrates the dialog box for XY Graph/Historical Trend. As shown, this dialog allows the user to select a tag, the automatic update value, and time axis information.

Block Diagram Portion Generation

Once the user associates the front panel object with a tag and sets the various configuration parameters, the MMI Wizard then selects a template VI matching the configuration. LabVIEW extracts the tag loop from the template VI and drops it on the block diagram. For example, for the Numeric Indicator configuration shown in FIG. 30, the tag loop shown in FIG. 31 appears on the block diagram. In other words, when the user configures the Numeric Indicator configuration panel as shown in FIG. 30, in response the wizard creates the tag loop shown in FIG. 31 and places this tag loop in the user's block diagram The front panel terminal for "Analog Val", which is the front panel object on which wizard was invoked, is automatically inserted into the loop. If the terminal was previously wired in the block diagram, then that connection is broken. Any attributes or locals copied from the template VI will now refer to "Analog Val".

Front panel object and block diagram portion association

Figure 32:
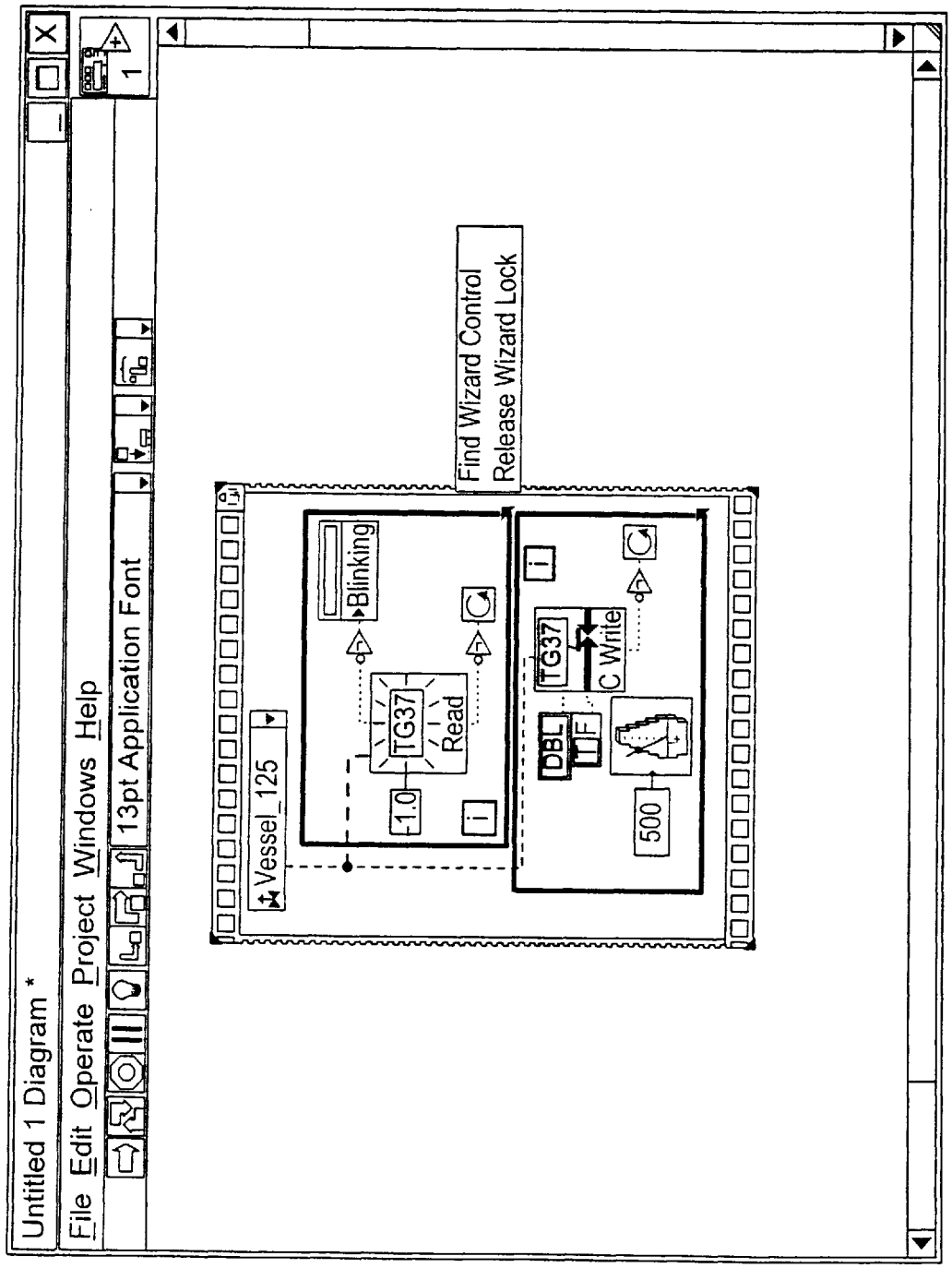
FIG. 32 illustrates a user popping up on the tag loop and selecting the "release Wizard lock" option in order to directly edit the tag loop.

When the MMI Wizard places or "drops" a tag loop into a block diagram, LabVIEW creates an association between the front panel object and the generated tag loop. It is undesirable for a new tag loop to be generated on every subsequent invocation of the wizard on a given object. Instead, when the user invokes the MMI wizard again on a control and selects a different configuration, the association enables LabVIEW to remember and replace the existing tag loop with a new one. The association is protected by a "Wizard Lock" which prevents the tag loop from being edited by the user. The lock glyph on the tag loop in the diagram of FIG. 31 indicates that the tag loop is locked by the Wizard. To edit the tag loop, the user is required to pop up on the tag loop and select "Release Wizard Lock" as shown in FIG. 32.

Once the Wizard Lock is released, the association is broken. The wizard no longer identifies the tag loop as being created by it. After the association is broken, invoking the wizard on "Analog Val" generates a new tag loop.

Figure 33:
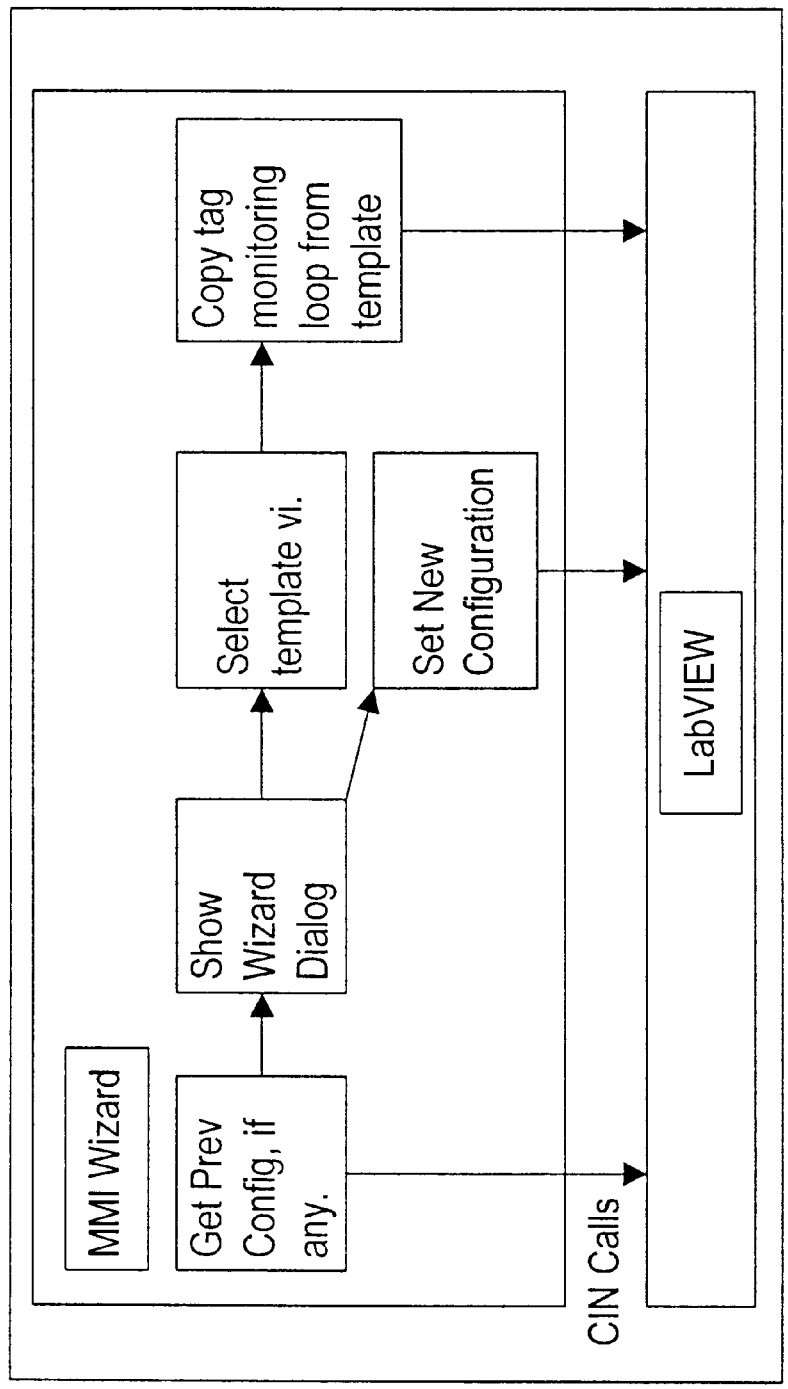
FIG. 33 illustrates events that occur between the MMI Wizard and the LabVIEW Graphical Programming System when the MMI Wizard is invoked.

FIG. 33 illustrates the events that occur when the MMI Wizard is invoked. Although FIG. 33 uses the MMI Wizard as an example, it is noted that FIG. 33 illustrates the preferred process performed by every graphical code generation wizard. FIG. 33 essentially illustrates the operation shown in the flowchart of FIG. 4.

As shown, the wizard first attempts to obtain the previously stored configuration data (if any) of an object through a CIN call. The wizard then uses the configuration data to bring up a dialog reflecting the current configuration.

If no data was stored with the object, then the dialog shows the default configuration. After the user selects a new configuration, the wizard selects a template matching the configuration and copy-pastes the tag loop into the user's block diagram. The wizard also saves the new configuration data with the object. The copy-pasting of tag loop, and getting and setting of configuration data is preferably performed through CIN (code interface node) calls which call hook functions (CopyWizardTemplate, GetWizardData and SetWizardData respectively) within LabVIEW.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer-implemented method for automatically generating graphical code for a graphical program, wherein the graphical program performs a man/machine interface function for monitoring and/or controlling a process, wherein the method operates in a computer system including a display screen, the method comprising:

configuring a front panel interface on the display screen in response to user input, wherein the front panel interface is useable for monitoring and/or controlling the process, wherein said configuring includes selecting at least one front panel object which represents input to or output from the graphical program;

associating the at least one front panel object with at least one data value in the process;

configuring one or more parameter values in response to user input, wherein said one or more parameter values indicate a desired functionality of the graphical program;

automatically selecting a graphical code portion in response to the at least one front panel object, wherein said selected graphical code portion corresponds to said at least one front panel object;

automatically configuring said graphical code portion with said one or more parameter values to produce a configured graphical code portion, wherein said configured graphical code portion comprises at least a portion of the graphical program.

2. The method of claim 1, wherein said selecting the graphical code portion is also performed in response to said configuring said one or more parameter values.

3. The method of claim 1, wherein said selecting the graphical code portion and said configuring said graphical code portion are automatically performed in response to said configuring the front panel interface, said associating, and said configuring said one or more parameter values.

4. The method of claim 1, wherein said automatically configuring said graphical code portion includes displaying on the screen said configured graphical code portion in the graphical program.

5. The method of claim 1, further comprising:

storing a plurality of graphical code portions in the memory of the computer system;

wherein the graphical programming system includes a plurality of front panel objects, wherein a first plurality of said plurality of front panel objects includes associated graphical code portions, wherein at least one associated graphical code portion can be associated with each of said first plurality of front panel objects;

wherein said selecting the front panel object includes selecting a first front panel object from said first plurality of front panel objects;

wherein said automatically selecting the graphical code portion comprises automatically selecting a first graphical code portion from said plurality of graphical code portions stored in the memory of the computer system, wherein said first graphical code portion is automatically associated with said first front panel object.

6. The method of claim 5, wherein said plurality of graphical code portions are stored in a first memory area of the computer system; the method further comprising:

displaying on the screen a graphical program panel for displaying graphical code, wherein graphical code comprised in said graphical program panel is stored in a second memory area of the computer system wherein said automatically configuring said graphical code portion includes:

copying said configured graphical code portion from said first memory area to said second memory area; and displaying said configured graphical code portion in the graphical program panel.

7. The method of claim 1, wherein said selecting the front panel object includes displaying the front panel object on a panel, wherein the front panel object is operable to display data input to or output from the graphical program.

8. The method of claim 1, further comprising:

selecting new one or more parameter values for said front panel object in response to user input after said configuring said graphical code portion; and automatically configuring said graphical code portion with said new one or more parameter values to produce a new configured graphical code portion in response to said new one or more parameter values.

9. The method of claim 1, further comprising:

creating an association between said front panel object and said configured graphical code portion, selecting new one or more parameter values for said front panel object in response to user input after said creating said association; and automatically configuring said graphical code portion with said new one or more parameter values to produce a new configured graphical code portion in response to said new one or more parameter values;

wherein said automatically configuring said graphical code portion with said new one or more parameter values uses said association between said front panel object and said configured graphical code portion, wherein said association remains between said front panel object and said new configured graphical code portion.

10. The method of claim 1, wherein said selecting the one or more parameter values comprises displaying on the screen a configuration panel;

wherein the one or more parameter values are selected using said configuration panel.

11. The method of clam 10, further comprising:

receiving user input indicating desire to change said configured graphical code portion;

displaying parameter configuration information of said configured graphical code portion in said configuration panel;

modifying said parameter configuration information in said configuration panel in response to user input; and automatically modifying said configured graphical code portion in response to said modifying said parameter configuration information.

12. The method of claim 11, further comprising:

wherein said automatically modifying said configured graphical code portion in response to said modifying said parameter configuration information includes selecting a new graphical code portion in response to said modifying said parameter configuration information.

13. The method of claim 1, further comprising:

receiving user input initiating a graphical code generation wizard, wherein said configuring the one or more parameter values, selecting the graphical code portion and said configuring the graphical code portion with said one or more parameter values are performed automatically in response to said initiating the graphical code generation wizard.

14. The method of claim 13, further comprising:

creating an association between said front panel object and said configured graphical code portion;

receiving user input selecting the graphical code generation wizard after said creating said association;

determining if said front panel object has a configured graphical code portion in response to said receiving user input initiating the graphical code generation wizard;

configuring one or more new parameter values in response to user input, wherein said one or more new parameter values are configured in response to determining that said front panel object has a configured graphical code portion, wherein said one or more new parameter values indicate a new desired functionality of the graphical program;

automatically configuring said graphical code portion with said one or more new parameter values to produce a new configured graphical code portion, wherein said configuring said graphical code portion with said new one or more parameter values uses said association between said front panel object and said configured graphical code portion, wherein said association remains between said front panel object and said new configured graphical code portion.

15. The method of claim 1, further comprising:

creating an association ween said front panel object and said configured graphical code portion;

locking said association between said front panel object and said configured graphical code portion, wherein said locking prevents user editing of said configured graphical code portion.

16. The method of claim 15, further comprising:

unlocking said association between said front panel object and said configured graphical code portion in response to user input after said locking, wherein said unlocking removes said association between said front panel object and said configured graphical code portion;

directly changing said configured graphical code portion in response to user input after said unlocking.

17. The method of claim 15, further comprising:

receiving user input selecting the graphical code generation wizard after said locking;

selecting one or more new parameter values in response to user input after said receiving user input selecting the graphical code generation wizard, wherein said one or more new parameter values indicate a new desired functionality of the graphical program;

configuring said graphical code portion with said one or more new parameter values to produce a new configured graphical code portion, wherein said association remains between said front panel object and said new configured graphical code portion, wherein said association remains locked.

18. The method of claim 15, wherein said front panel object has a first type, the method further comprising:

receiving user input to replace said front panel object with a different front panel object after said configuring said graphical code portion and after said creating said association between said front panel object and said configured graphical code portion;

automatically determining if said different front panel object has said first type;

automatically maintaining the association between said different front panel object and said configured graphical code portion in response to determining that said different front panel object has said first type.

19. The method of claim 15, further comprising:

modifying said front panel object in response to user input after said configuring said graphical code portion and after said creating said association between said front panel object and said configured graphical code portion;

determining if an association exists between said front panel object and a graphical code portion in response to said modifying said front panel object;

removing the association between said front panel object and said configured graphical code portion in response to said modifying.

20. The method of claim 1, wherein said graphical code portion comprises at least a portion of a graphical data flow program.

21. The method of claim 1, wherein said selecting the front panel object comprises selecting a plurality of front panel objects which each represent input to or output from the graphical program, wherein said plurality of front panel objects are selected in response to user input, wherein said plurality of front panel objects form at least a portion of the graphical user interface for the graphical program;

wherein the graphical code portion is automatically selected in response to said plurality of front panel objects, wherein said selected graphical code portion corresponds to said plurality of front panel objects.

22. The method of claim 1, wherein said graphical code portion comprises a tag monitoring loop for monitoring and/or controlling the at least one data value.

23. The method of claim 22, further comprising:

storing a plurality of graphical code portions in the memory of the computer system, wherein each of said graphical code portions comprises a tag monitoring loop;

wherein the graphical programming system includes a plurality of front panel objects, wherein a first plurality of said plurality of front panel objects includes associated tag monitoring loops, wherein at least one associated tag monitoring loop can be associated with each of said first plurality of front panel objects;

wherein said selecting the front panel object includes selecting a first front panel object from said first plurality of front panel objects;

wherein said automatically selecting the graphical code portion comprises selecting a first tag monitoring loop from said plurality of tag monitoring loops stored in the memory of the computer system, wherein said first tag monitoring loop is associated with said first front panel object.

24. The method of claim 1, wherein said one or more parameter values include values for configuring alarm condition notification.

25. The method of claim 1, wherein said one or more parameter values include a time period value for polling the data value.

26. The method of claim 1, wherein said at least one front panel object is selected from the group comprising numeric indicators, numeric controls, Boolean indicators, Boolean controls, Table indicators, Waveform chart indicators, and XY Graph.

27. A memory media which stores program instructions for automatically generating graphical code for a graphical program, wherein the graphical program performs a man/machine interface function for monitoring and/or controlling a process, wherein the method operates in a computer system including a display screen, wherein the program instructions are executable to implement:

configuring a front panel interface on the display screen in response to user input, wherein the front panel interface is useable for monitoring and/or controlling the process, wherein said configuring includes selecting at least one front panel object which represents input to or output from the graphical program;

associating the at least one front panel object with at least one data value in the process;

configuring one or more parameter values in response to user input, wherein said one or more parameter values indicate a desired functionality of the graphical program;

automatically selecting a graphical code portion in response to the at least one front panel object, wherein said selected graphical code portion corresponds to said at least one front panel object;

automatically configuring said graphical code portion with said one or more parameter values to produce a configured graphical code portion, wherein said configured graphical code portion comprises at least a portion of the graphical program.

28. The memory media of claim 27, wherein said selecting the graphical code portion is also performed in response to said configuring said one or more parameter values.

29. The memory media of claim 27, wherein said selecting the graphical code portion and said configuring said graphical code portion are automatically performed in response to said configuring the front panel interface, said associating, and said configuring said one or more parameter values.

30. The memory media of claim 27, wherein said automatically configuring said graphical code portion includes displaying on the screen said configured graphical code portion in the graphical program.

31. The memory media of claim 27, wherein the program instructions further implement:

storing a plurality of graphical code portions in the memory of the computer system;

wherein the graphical programming system includes a plurality of front panel objects, wherein a first plurality of said plurality of front panel objects includes associated graphical code portions, wherein at least one associated graphical code portion can be associated with each of said first plurality of front panel objects;

wherein said selecting the front panel object includes selecting a first front panel object from said first plurality of front panel objects;

wherein said automatically selecting the graphical code portion comprises automatically selecting a first graphical code portion from said plurality of graphical code portions stored in the memory of the computer system, wherein said first graphical code portion is automatically associated with said first front panel object.

32. The memory media of claim 31, wherein said plurality of graphical code portions are stored in a first memory area of the computer system; wherein the program instructions further implement:

displaying on the screen a graphical program panel for displaying graphical code, wherein graphical code comprised in said graphical program panel is stored in a second memory area of the computer system wherein said automatically configuring said graphical code portion includes:

copying said configured graphical code portion from said first memory area to said second memory area; and displaying said configured graphical code portion in the graphical program panel.

33. The memory media of claim 27, wherein said selecting the front panel object includes displaying the front panel object on a panel, wherein the front panel object is operable to display data input to or output from the graphical program.

34. The memory media of claim 27, wherein the program instructions further implement:

selecting new one or more parameter values for said front panel object in response to user input after said configuring said graphical code portion; and automatically configuring said graphical code portion with said new one or more parameter values to produce a new configured graphical code portion in response to said new one or more parameter values.

35. The memory media of claim 27, wherein the program instructions further implement:

creating an association between said front panel object and said configured graphical code portion, selecting new one or more parameter values for said front panel object in response to user input after said creating said association; and automatically configuring said graphical code portion with said new one or more parameter values to produce a new configured graphical code portion in response to said new one or more parameter values;

wherein said automatically configuring said graphical code portion with said new one or more parameter values uses said association between said front panel object and said configured graphical code portion, wherein said association remains between said front panel object and said new configured graphical code portion.

36. The memory media of claim 27, wherein said selecting the one or more parameter values comprises displaying on the screen a configuration panel;

wherein the one or more parameter values are selected using said configuration panel.

37. The memory media of claim 36, wherein the program instructions further implement:

receiving user input indicating a desire to change said configured graphical code portion;

displaying parameter configuration information of said configured graphical code portion in said configuration panel;

modifying said parameter configuration information in said configuration panel in response to user input; and automatically modifying said configured graphical code portion in response to said modifying said parameter configuration information.

38. The memory media of claim 37, wherein the program instructions further implement:

wherein said automatically modifying said configured graphical code portion in response to said modify said parameter configuration information includes selecting a new graphical code portion in response to said modifying said parameter configuration information.

39. The memory media of claim 27, wherein the program instructions further implement:

receiving user input initiating a graphical code generation wizard;

wherein said configuring the one or more parameter values, selecting the graphical code portion and said configuring the graphical code portion with said one or more parameter values are performed automatically in response to said initiating the graphical code generation wizard.

40. The memory media of claim 39, wherein the program instructions further implement:

creating an association between said front panel object and said configured graphical code portion;

receiving user input selecting the graphical code generation wizard after said creating said association;

determining if said front panel object has a configured graphical code portion in response to said receiving user input initiating the graphical code generation wizard;

configuring one or more new parameter values in response to user input, wherein said one or more new parameter values are configured in response to determining that said front panel object has a configured graphical code portion, wherein said one or more new parameter values indicate a new desired functionality of the graphical program;

automatically configuring said graphical code portion with said one or more new parameter values to produce a new configured graphical code portion, wherein said configuring said graphical code portion with said new one or more parameter values uses said association between said front panel object and said configured graphical code portion, wherein said association remains between said front panel object and said new configured graphical code portion.

41. The memory media of claim 27, wherein the program instructions further implement:

creating an association between said front panel object and said configured graphical code portion;

locking said association between said front panel object and said configured graphical code portion, wherein said locking prevents user editing of said configured graphical code portion.

42. The memory media of claim 41, wherein the program instructions further implement:

unlocking said association between said front panel object and said configured graphical code portion in response to user input after said locking, wherein said unlocking removes said association between said front panel object and said configured graphical code portion;

directly changing said configured graphical code portion in response to user input after said unlocking.

43. The memory media of claim 41, wherein the program instructions further implement:

receiving user input selecting the graphical code generation wizard after said locking;

selecting one or more new parameter values in response to user input after said receiving user input selecting the graphical code generation wizard, wherein said one or more new parameter values indicate a new desired functionality of the graphical program;

configuring said graphical code portion with said one or more new parameter values to produce a new configured graphical code portion, wherein said association remains between said front panel object and said new configured graphical code portion, wherein said association remains locked.

44. The memory media of claim 41, wherein said front panel object has a first type, wherein the program instructions further implement:

receiving user input to replace said front panel object with a different front panel object after said configuring said graphical code portion and after said creating said association between said front panel object and said configured graphical code portion;

automatically determining if said different front panel object has said first type;

automatically maintaining the association between said different front panel object and said configured graphical code portion in response to determining that said different front panel object has said first type.

45. The memory media of claim 41, wherein the program instructions further implement:

modifying said front panel object in response to user input after said configuring said graphical code portion and after said creating said association between said front panel object and said configured graphical code portion;

determining if an association exists between said front panel object and a graphical code portion in response to said modify said front panel object;

removing the association between said front panel object and said configured graphical code portion in response to said modifying.

46. The method of claim 27, wherein said graphical code portion comprises at least a portion of a graphical data flow program.

47. The memory media of claim 27, wherein said selecting the front panel object comprises selecting a plurality of front panel objects which each represent input to or output from the graphical program, wherein said plurality of front panel objects are selected automatically in response to user input, wherein said plurality of front panel objects form at least a portion of the graphical user interface for the graphical program;

wherein the graphical code portion is selected in response to said plurality of front panel objects, wherein said selected graphical code portion corresponds to said plurality of front panel objects.

48. The memory media of claim 27, wherein said graphical code portion comprises a tag monitoring loop for monitoring and/or controlling the at least one data value.

49. The memory media of claim 48, further comprising:

storing a plurality of graphical code portions in the memory of the computer system, wherein each of said graphical code portions comprises a tag monitoring loop;

wherein the graphical programming system includes a plurality of front panel objects, wherein a first plurality of said plurality of front panel objects includes associated tag monitoring loops, wherein at least one associated tag monitoring loop can be associated with each of said first plurality of front panel objects;

wherein said selecting the front panel object includes selecting a first front panel object from said first plurality of front panel objects;

wherein said selecting the graphical code portion comprises automatically selecting a first tag monitoring loop from said plurality of tag monitoring loops stored in the memory of the computer system, wherein said first tag monitoring loop is associated with said first front panel object.

50. The memory media of claim 27, wherein said one or more parameter values include values for configuring alarm condition notification.

51. The memory media of claim 27, wherein said one or more parameter values include a time period value for polling the data value.

52. The memory media of claim 27, wherein said at least one front panel object is selected from the group comprising numeric indicators, numeric controls, Boolean indicators, Boolean controls, Table indicators, Waveform chart indicators, and XY Graph.

* * * * *

UNITED STATES PATENT AND TRADEMARK OFFICE
CERTIFICATE OF CORRECTION

PATENT NO.: 6,053,951

DATED: April 25, 2000

INVENTOR(S): McDonald et al.

It is certified that error appears in the above-identified patent and that said Letters Patent is hereby corrected as shown below:

Claim 11, col. 27, line 54, please delete "desire" and substitute --a desire--.

Claim 15, col. 28, line 41, please delete "ween" and substituted --between--.

Signed and Sealed this

Twenty-seventh Day of February, 2001

*Attest:*

NICHOLAS P. GODICI

*Attesting Officer*     Acting Director of the United States Patent and Trademark Office